(12) United States Patent
Barnard

(10) Patent No.: US 12,277,641 B2
(45) Date of Patent: Apr. 15, 2025

(54) METHODS AND HARDWARE LOGIC FOR WRITING RAY TRACING DATA FROM A SHADER PROCESSING UNIT OF A GRAPHICS PROCESSING UNIT

(71) Applicant: Imagination Technologies Limited, Kings Langley (GB)

(72) Inventor: Daniel Barnard, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 204 days.

(21) Appl. No.: 18/126,460

(22) Filed: Mar. 26, 2023

(65) Prior Publication Data

US 2023/0334758 A1    Oct. 19, 2023

(30) Foreign Application Priority Data

Mar. 31, 2022   (GB) ..................... 2204680
Mar. 31, 2022   (GB) ..................... 2204701

(51) Int. Cl.
*G06T 1/20*     (2006.01)
*G06T 1/60*     (2006.01)
*G06T 15/00*    (2011.01)
*G06T 15/06*    (2011.01)
*G06T 15/80*    (2011.01)

(52) U.S. Cl.
CPC .............. *G06T 15/005* (2013.01); *G06T 1/20* (2013.01); *G06T 1/60* (2013.01); *G06T 15/06* (2013.01); *G06T 15/80* (2013.01)

(58) Field of Classification Search
CPC ........... G06T 1/20; G06T 1/60; G06T 15/005; G06T 15/06; G06T 15/80

USPC ................................................ 345/501, 537
See application file for complete search history.

(56) References Cited

U.S. PATENT DOCUMENTS

| | | |
|---|---|---|
| 2009/0096788 A1 | 4/2009 | Salsbury et al. |
| 2009/0128562 A1 | 5/2009 | McCombe et al. |
| 2011/0032257 A1 | 2/2011 | Peterson et al. |
| | (Continued) | |

FOREIGN PATENT DOCUMENTS

EP        3220356 A1    9/2017

*Primary Examiner* — Jacinta M Crawford
(74) *Attorney, Agent, or Firm* — Potomac Law Group, PLLC; Vincent M DeLuca

(57) ABSTRACT

Shader processing units for a graphics processing unit that are configured to execute one or more ray tracing shaders that generate ray data associated with one or more rays. The ray data for a ray includes a plurality of ray data elements. The shader processing unit comprises local storage, and store logic. The store logic is configured to receive, as part of a ray tracing shader, a ray store instruction that comprises: (i) information identifying a store group of a plurality of store groups, each store group of the plurality of store groups comprising one or more ray data elements of the plurality of ray data elements, and (ii) information identifying one or more ray data elements of the identified store group to be stored in an external unit). In response to receiving the ray store instruction, the store logic retrieves the identified ray data elements for one or more rays from the storage. The store logic then sends one or more store requests to an external unit which cause the external unit to store the identified ray data elements for the one or more rays.

20 Claims, 14 Drawing Sheets

(56) References Cited

U.S. PATENT DOCUMENTS

| | | | |
|---|---|---|---|
| 2013/0057562 A1* | 3/2013 | Nordlund | G06F 12/0802 |
| | | | 345/522 |
| 2013/0155080 A1* | 6/2013 | Nordlund | G06T 15/005 |
| | | | 345/522 |
| 2014/0098086 A1 | 4/2014 | Burley et al. | |
| 2015/0109302 A1 | 4/2015 | Lee et al. | |
| 2016/0071310 A1 | 3/2016 | Karras et al. | |
| 2016/0071312 A1* | 3/2016 | Laine | G06T 17/10 |
| | | | 345/419 |
| 2021/0125395 A1 | 4/2021 | Croxford et al. | |
| 2021/0287423 A1 | 9/2021 | Guenther et al. | |
| 2021/0295583 A1 | 9/2021 | Vaidyanathan et al. | |
| 2022/0036639 A1* | 2/2022 | Rabbani Rankouhi | |
| | | | G06T 15/06 |

* cited by examiner

| Block | Set / Mask Bit | RID | Primary | Launch Size | Trace | Query | Call | Debug |
|---|---|---|---|---|---|---|---|---|
| 0 | 0 | RID | | | | | | |
| 0 | 1 | | PAYLOAD_0 | | ORIGIN_X | CD_T | PAYLOAD_0 | NCM_T |
| 0 | 2 | | PAYLOAD_1 | LAUNCH_SZ_X | ORIGIN_Y | CM_T | PAYLOAD_1 | |
| 0 | 3 | | PAYLOAD_2 | LAUNCH_SZ_Y | ORIGIN_Z | FLAGS | PAYLOAD_2 | |
| 1 | 4 | | | LAUNCH_SZ_Z | DIRECTION_X | | | |
| 1 | 5 | | LAUNCH_ID_X | | DIRECTION_Y | CD_INST_IN | ORIGIN_X | NCM_INST_IN |
| 1 | 6 | | LAUNCH_ID_Y | | DIRECTION_Z | CD_PRIM_IN | ORIGIN_Y | NCM_PRIM_IN |
| 1 | 7 | | LAUNCH_ID_Z | | TMIN | CD_GEOM_IN | ORIGIN_Z | NCM_GEOM_IN |
| 2 | 8 | | | | CM_T / CD_T | CM_INST_IN | DIRECTION_X | MISS_INDEX |
| 2 | 9 | | | | FLAGS | CM_PRIM_IN | DIRECTION_Y | SBT_OFFSET |
| 2 | 10 | | | | U | CM_GEOM_IN | DIRECTION_Z | SBT_STRIDE |
| 2 | 11 | | | | V | U | NCM_T | |
| 3 | 12 | | | | ACC_STRUCT | V | CM_T | |
| 3 | 13 | | | | CD_INST_IN | | TMIN | |
| 3 | 14 | | | | CD_PRIM_IN | | CD_T | |
| 3 | 15 | | | | CD_GEOM_IN | | ACC_STRUCT | |
| 4 | 16 | | | | PAYLOAD_0 | | U | |
| 4 | 17 | | | | PAYLOAD_1 | | V | |
| 4 | 18 | | | | PAYLOAD_2 | | | |
| 4 | 19 | | | | | | | |

FIG. 2

| Block | Set / Offset | Trace | Query | Call |
|---|---|---|---|---|
| 0 | 0 | ORIGIN_X | ORIGIN_X | MISS_INDEX |
| 0 | 1 | ORIGIN_Y | ORIGIN_Y | PAYLOAD_0 |
| 0 | 2 | ORIGIN_Z | ORIGIN_Z | PAYLOAD_1 |
| 0 | 3 | DIRECTION_X | DIRECTION_X | PAYLOAD_2 |
| 0 | 4 | DIRECTION_Y | DIRECTION_Y | ORIGIN_X |
| 0 | 5 | DIRECTION_Z | DIRECTION_Z | ORIGIN_Y |
| 1 | 6 | ACC_STRUCT | ACC_STRUCT | ORIGIN_Z |
| 1 | 7 | NCM_T / TMIN | NCM_T | DIRECTION_X |
| 1 | 8 | CM_T / CD_T | CM_T / CD_T | DIRECTION_Y |
| 2 | 9 | FLAGS | FLAGS | DIRECTION_Z |
| 2 | 10 | SBT_OFFSET | CM_INST_IN / NCM_INST_IN | NCM_T |
| 2 | 11 | SBT_STRIDE | CM_PRIM_IN / NCM_PRIM_IN | CM_T |
| 2 | 12 | MISS_INDEX | CM_GEOM_IN / NCM_GEOM_IN | TMIN |
| 3 | 13 | PAYLOAD_0 | CM_INST_IN / CD_INST_IN | CD_T |
| 3 | 14 | PAYLOAD_1 | CM_PRIM_IN / CD_PRIM_IN | ACC_STRUCT |
| 3 | 15 | PAYLOAD_2 | CM_GEOM_IN / CD_GEOM_IN | U |
| 4 | 16 | | | V |
| 4 | 17 | | | |
| 4 | 18 | | | |
| 4 | 19 | | | |

FIG. 8

| INSTANCE | ADDR | MASK | DATA-0 | DATA-1 | DATA-2 | DATA-3 | SPACE | SPACE_CTRL |
|---|---|---|---|---|---|---|---|---|
| 1202 | 1204 | 1206 | 1210 | 1212 | 1214 | 1216 | 1208 | 1218 |

Store Transaction Request

METHODS AND HARDWARE LOGIC FOR WRITING RAY TRACING DATA FROM A SHADER PROCESSING UNIT OF A GRAPHICS PROCESSING UNIT

BACKGROUND

A graphics processing unit (GPU) is hardware designed to accelerate the generation of a rendering output (e.g. image). Many of today's GPUs generate a rendering output (e.g. an image) by processing graphics data in accordance with one or more programmable shaders. Where the GPU supports ray tracing the GPU may comprise one or more shader processing units that are capable of executing one or more ray tracing shaders to perform various functions such as, but not limited to, generating rays, determining intersections, and processing intersections. As is known to those of skill in the art, ray tracing shaders operate on and/or generate ray data (e.g. origin co-ordinates, direction co-ordinates, intersection max/min distances, acceleration structure) associated with one or more rays. The ray data associated with a ray can be quite large therefore ray data, or portions thereof, associated with rays that are currently being processed by a ray tracing shader may be dynamically loaded into and/or dynamically written out from a shader processing unit as it is needed or as it is generated, respectively. Being able to efficiently load ray data into and/or write ray data from a shader processing unit can improve the performance of the shader processing unit and thus the GPU.

The embodiments described below are provided by way of example only and are not limiting of implementations which solve any or all of the disadvantages of known shader processing units which are capable of executing ray tracing shaders.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are shader processing units for a graphics processing unit that are configured to execute one or more ray tracing shaders that generate ray data associated with one or more rays. The ray data for a ray includes a plurality of ray data elements. The shader processing unit comprises local storage, and store logic. The store logic is configured to receive, as part of a ray tracing shader, a ray store instruction that comprises: (i) information identifying a store group of a plurality of store groups, each store group of the plurality of store groups comprising one or more ray data elements of the plurality of ray data elements, and (ii) information identifying one or more ray data elements of the identified store group to be stored in an external unit). In response to receiving the ray store instruction, the store logic retrieves the identified ray data elements for one or more rays from the storage. The store logic then sends one or more store requests to an external unit which cause the external unit to store the identified ray data elements for the one or more rays.

A first aspect provides a shader processing unit for a graphics processing unit, the shader processing unit configured to execute one or more shaders, the one or more shaders comprising one or more ray tracing shaders that generate ray data associated with one or more rays, the ray data for a ray comprising a plurality of ray data elements, the shader processing unit comprising: storage; and store logic configured to: receive a ray store instruction that comprises: (i) information identifying a store group of a plurality of store groups, each store group of the plurality of store groups comprising one or more ray data elements of the plurality of ray data elements, and (ii) information identifying one or more ray data elements of the identified store group to be stored in an external unit); in response to receiving the ray store instruction, retrieve the identified ray data elements for one or more rays from the storage; and send one or more store requests to the external unit which cause the external unit to store the identified ray data elements for the one or more rays.

The information identifying one or more ray data elements of the identified store group may identify a block of ray data elements of the identified store group.

The one or more ray data elements of each store group may be divided into one or more sets of ray data elements, and the information identifying one or more ray data elements of the identified store group may comprise information identifying one or more of the one or more sets of ray data elements of the identified store group.

Each set of ray data elements of a store group may be associated with an offset indicating an ordering of that set of ray data elements with respect to the other sets of ray data elements in the store group, and the information identifying one or more sets of ray data elements may identify sets of ray data elements associated with a contiguous block of offsets.

The information identifying one or more ray data elements of the identified store group may comprise information identifying a starting offset for the contiguous block of offsets and information identifying a number of offsets in the contiguous block of offsets.

When at least one of the identified sets of ray data elements comprises two or more ray data elements, the information identifying one or more ray data elements of the identified store group may comprise information identifying a ray data element of each of the at least one of the identified sets of ray data elements that comprise two or more ray data elements.

The identified ray data elements for the one or more rays may be sent to the external unit in a plurality of store transactions, each store transaction comprising up to a predetermined maximum number of ray data elements; the store logic may be configured to divide the identified ray data elements for the one or more rays into the plurality of store transactions; and the one or more store requests sent from the store logic to the external unit may comprise a store transaction request for each of the plurality of store transactions.

Each store transaction may comprise ray data elements associated with a same ray of the one or more rays.

The ray data elements of each store group may be divided into one or more blocks of ray data elements, and each store transaction may comprise ray data elements in a same block of ray data elements.

Each block of ray data elements for a store group may comprise one or more of the one or more sets of ray data elements of that store group.

Each block of ray data elements for a store group may comprise sets of ray data elements of that store group associated with a contiguous block of offsets.

Each store transaction request may comprise information identifying the store group identified in the ray store instruction, information identifying a block of ray data elements of the store group, information identifying the ray data elements of the block that are identified in the ray store instruction, information identifying a ray of the one or more rays, and the identified ray data elements.

The store logic may be configured to divide the identified ray data elements for the one or more rays into the plurality of store transactions by, for each of the one or more rays, determining which blocks of ray data elements of the identified store group comprises an identified ray data element, and for each block of ray data elements that comprises an identified ray data element, generating a store transaction request to store the identified ray data elements in that block for that ray.

The ray store instruction may be associated with a plurality of rays and the one or more rays for which the identified ray data elements are stored are active rays of the plurality of rays.

The ray store instruction may further comprise information identifying a location in the storage where the identified ray data elements are stored, and the store logic may be configured to retrieve the identified ray data elements from the identified location.

Each store group of the plurality of store groups may be associated with a unique identifier and the information identifying a store group may comprise the unique identifier associated with the store group.

A second aspect provides a method of processing a ray tracing shader at a shader processing unit of a graphics processing unit, the shader processing unit configured to execute one or more shaders, the one or more shaders comprising one or more ray tracing shaders that generate ray data associated with one or more rays, the ray data for a ray comprising a plurality of ray data elements, the method comprising: receiving, at the shader processing unit, a ray store instruction that comprises: (i) information identifying a store group of a plurality of store groups, each store group of the plurality of store groups comprising one or more ray data elements of the plurality of ray data elements, and (ii) information identifying one or more ray data elements of the identified store group to be stored in an external unit; in response to receiving the ray store instruction, retrieving the identified ray data elements for one or more rays from storage of the shader processing unit; and sending one or more store requests from the shader processing unit to an external unit which causes the external unit to store the identified ray data elements for the one or more rays.

A third aspect provides a shader processing unit configured to perform the method of the second aspect.

A fourth aspect provides a graphics processing unit comprising the shader processing unit of the first aspect or the third aspect.

The graphics processing unit may further comprise the external unit, the external unit may comprise one or more local storage units and be configured to map the ray data elements of each load group to locations in the one or more local storage units.

The shader processing units, load units, store units and graphics processing units described herein may be embodied in hardware on an integrated circuit. There may be provided a method of manufacturing, at an integrated circuit manufacturing system, a shader processing unit, a load unit, a store unit and/or a graphics processing unit described herein. There may be provided an integrated circuit definition dataset that, when processed in an integrated circuit manufacturing system, configures the system to manufacture a shader processing unit, a load unit, a store unit and/or a graphics processing unit described herein. There may be provided a non-transitory computer readable storage medium having stored thereon a computer readable description of a shader processing unit, a load unit, a store unit and/or a graphics processing unit described herein that, when processed in an integrated circuit manufacturing system, causes the integrated circuit manufacturing system to manufacture an integrated circuit embodying the shader processing unit, the load unit, the store unit or the graphics processing unit.

There may be provided an integrated circuit manufacturing system comprising: a non-transitory computer readable storage medium having stored thereon a computer readable description of a shader processing unit, a load unit, a store unit or a graphics processing unit described herein; a layout processing system configured to process the computer readable description so as to generate a circuit layout description of an integrated circuit embodying the shader processing unit, the load unit, the store unit or the graphics processing unit; and an integrated circuit generation system configured to manufacture the shader processing unit, the load unit, the store unit or the graphics processing unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2 is a schematic diagram of example load groups of ray data elements;

FIG. 8 is a schematic diagram of example store groups of ray data elements;

FIG. 12 is a schematic diagram of an example format for a store transaction request;

Figure 1:
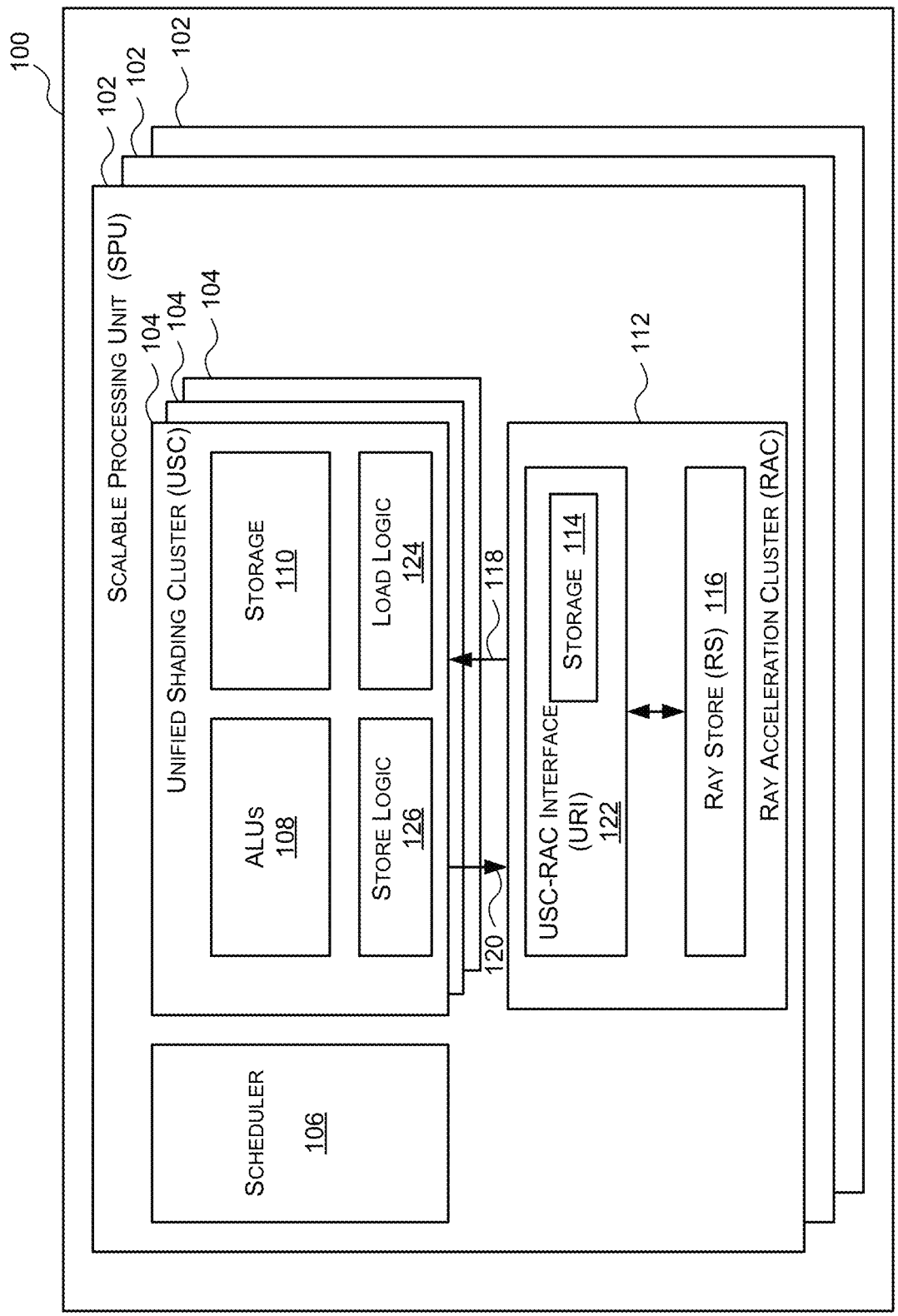
FIG. 1 is a block diagram of an example graphics processing unit with a plurality of shader processing units.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, many of today's GPUs generate a rendering output (e.g. an image) by processing graphics data in accordance with one or more programmable shaders. As is known to those of skill in the art, a shader is a program run by a GPU that is generally, but not necessarily, used to implement rendering effects. They are called shaders because they were traditionally used to control lighting and shading effects, but they may also be used to implement other effects. The shaders that are applied to the graphics data depend on the rendering technique used to generate the rendering output.

Two example rendering techniques used to generate a rendering output are rasterization and ray tracing. In rasterization, the geometry of each object is built up using a mesh of primitives (e.g. triangles) and then shaded to determine its appearance. In rasterization, geometry data may be processed in two phases—a geometry processing phase and a rasterization phase. In the geometry processing phase the geometry data (e.g. vertices defining primitives or patches) received from an application is transformed into the rendering space (e.g. screen space). Other functions such as clipping and culling to remove geometry (e.g. primitives or patches) that falls outside of the viewing frustum, and/or lighting attribute processing may also be performed in the geometry processing phase. In the rasterization phase the transformed primitives are mapped to pixels and the colour is identified for each pixel. This may comprise rasterizing the transformed geometry data (e.g. by performing scan conversion) to generate primitive fragments. The primitive fragments that are hidden (e.g. hidden by other fragments) may then be removed through a process called hidden surface removal. Texturing and/or shading may then be applied to primitive fragments that are not hidden to determine pixel values of a rendering output (e.g. image).

Shaders used to implement the rasterization technique include, but are not limited to, vertex shaders which are used to transform attributes of geometry (e.g. primitive) vertices such as colour, texture, position and direction; geometry shaders which have the ability to create new geometry on the fly; and pixel shaders or fragment shaders which are configured to operate on individual pixels or fragments to implement complex visual effects.

In contrast to rasterization where how light affects the image can only be approximated, ray tracing mimics how light works in the real world. Specifically, ray tracing sends out rays from the user viewpoint into a scene, onto objects and from there to the light source. As the light interacts with objects it is blocked, reflected, or refracted by the objects along the way, depending on their material properties, creating shadows and reflections.

Shaders used to implement the ray tracing technique may be used, for example, to generate rays, determine intersections, and process intersections.

Rasterization and ray tracing may be used independently or in combination.

While some GPUs have different hardware to implement or execute different shaders, many GPUs implement a unified shading architecture in which the GPU comprises common or unified shader hardware that can implement or execute multiple different shaders supported by the GPU. For example, FIG. 1 illustrates an example GPU 100 that comprises a plurality of scalable processing units (SPUs) 102, each of which comprise a plurality of shader processing units 104. In the example of FIG. 1 each shader processing unit is implemented as a unified shading cluster (USC), but this is an example only. Each USC 104 can execute a plurality of different types of shader tasks supported by the GPU 100. Specifically, each USC 104 receives shader tasks from a scheduler 106. Each shader task specifies the data to be processed and the shader (e.g. program) to be used to process that data. In response to receiving a shader task, a USC 104 executes the identified shader against the identified data. Executing a shader may comprise executing the set of instructions forming the shader.

Each USC 104 may comprise a plurality of arithmetic logic units (ALUs) 108 which can be configured to execute specific shader instructions, and local storage (e.g. registers) 110 which are used to store the data to be processed by the USC 104, data generated by the USC 104, and/or any other data that may be used by the USC 104. A USC 104 can typically execute multiple shader tasks concurrently and each of those shader tasks share the local storage 110. If the GPU 100 supports ray tracing, the USC 104 may be able to execute ray tracing shaders. Ray tracing shaders are generally executed on, and/or generate, ray data (i.e. data associated with a ray). However, since there can be many rays in-flight (i.e. being processed), and each ray can have a significant amount of data associated therewith (e.g. origin co-ordinates, direction co-ordinates, intersection min/max distances and acceleration structure), keeping all of the ray data for all the in-flight rays in the local storage 110 may not leave sufficient room in the local storage 110 to run other shader tasks, which may reduce the efficiency of the USC 104. Accordingly, all of the ray data may be stored in a storage unit of an external unit (i.e. a unit that is external to the USC 104) and portions thereof loaded into a USC 104 when required by that USC 104, or written out from the USC 104 when generated thereby.

For example, as shown in FIG. 1, the GPU 100 may comprise an external unit 112, (which, as an example, is implemented as a ray acceleration cluster (RAC) in FIG. 1), which comprises one or more storage units 114, 116 for storing ray data, and the USC 104 and the RAC 112 may be connected by one or more interfaces 118, 120 that allow ray data to be transferred between the USC 104 and the RAC 112. For example, there may be a load interface 118 that allows data to be transferred from the RAC 112 to the USC 104, and there may be a separate store interface 120 that allows data to be transferred from the USC 104 to the RAC 112. In the example shown in FIG. 1 the RAC 112 comprises an interface module 122, which may be referred to as a USC-RAC Interface (URI) 122, which is configured to (i) receive requests from a USC 104 for ray data and provide the requested data from the RAC 112 storage units 114, 116 to the USC 104 via the load interface 118; and (ii) receive requests from a USC 104 via the store interface 120 to write ray data to one or more of the RAC storage units 114, 116 and write the received data to one or more of the RAC 112 storage units 114, 116. In some cases, the RAC 112 may also include other components that are not shown in FIG. 1. For example, the RAC 112 may comprise one or more components to accelerate certain ray tracing operations.

To be able to retrieve ray tracing data from the RAC 112 storage units 114, 116, each USC 104 may comprise load logic 124 that is configured to receive load instructions which identify the ray data to be loaded into the USC 104 and send read requests to the RAC 112 to retrieve the identified ray data. To be able to store ray tracing data generated by the USC 104 in the RAC 112 storage units 114, 116, each USC 104 may comprise store logic 126 configured to receive store instructions which identify the ray data to be stored in the RAC 112 storage units 114, 116 and send write requests to the RAC 112 to store the identified ray data in the RAC 112 storage units 114, 116. However, GPUs with the structure shown in FIG. 1 (or a similar structure), which are known to the Applicant, which is not an admission that they are well-known or known outside the Applicant company, are configured to receive and process load and store instructions which identify a single chunk of storage (e.g. a dword, wherein a dword is defined as a double word, or 32 bits), or a contiguous block of N chunks of storage (e.g. four dwords), to be read from or written to at a time.

In such configurations, ray data can be loaded into the USC 104, or written out from the USC 104, a storage block at time, or individual chunks of ray data can be loaded in via individual instructions. However, since the portion of the ray data used and/or generated by different ray tracing shaders is often interspersed in the RAC 112 storage units 114, 116 with other ray data, if ray data is requested/written to on storage block basis this may result in a lot of unwanted or unnecessary data being transferred between the RAC 112 and the USC 104. This results in inefficient use of the load and store interfaces 118, 120 between the USC 104 and the RAC 112. Furthermore, while requesting/writing individual chunks of ray data may allow only the required ray data to be transferred between the RAC 112 and the USC 104, resulting in more efficient use of the load and store interfaces 118, 120 between the USC 104 and the RAC 112, this is at the expense of the USC 104 having to store, fetch and execute multiple instructions.

Accordingly, described herein are shader processing units (e.g. USCs) with (i) load logic 124 that is configured to receive and process load instructions that allow for more efficient loading of ray data from the RAC 112 into the USC 104; and/or (ii) store logic 126 that is configured to receive and process store instructions that allow for more efficient writing of ray data from the USC 104 to the RAC 112. Specifically, in the examples described herein the ray data comprises a plurality of ray data elements, and multiple groups of ray data elements are defined, wherein each group of ray data elements comprises a set of related ray data elements. Ray tracing elements may be "related" if they are often retrieved from, or written to, the RAC 112 storage unit 114, 116 together by a ray tracing shader. The USC 104 (i.e. the load logic 124 and/or store logic 126) is then configured to (i) receive and process load instructions, which allow combinations of individual ray data elements in the same group to be retrieved from the external unit (e.g. RAC 112 storage units 114, 116) with a single instruction; and/or (ii) receive and process store instructions, which allow ray data in the same group to be efficiently stored in the external unit (e.g. RAC 112 storage units 114, 116) with a single instruction. As described in more detail below, the groupings of ray data elements for load instructions may be different to the groupings of ray data elements for store instructions.

Since related ray data elements (those in a group), which may be dispersed throughout the storage units 114, 116 of the external unit 112, can be identified by a single load instruction, a single load instruction can be used to efficiently retrieve a plurality of related, but dispersed, ray data elements. Furthermore, since different combinations of ray data elements in a group can be identified, time and resources are not wasted transferring ray data elements that are not going to be used by a ray tracing shader, resulting in more efficient use of the load interface 118 between the USC 104 and the RAC 112. Similarly, since related ray data elements (those in a group), which may be dispersed throughout the storage of the external unit, can be identified with a single store instruction, a single store instruction can be used to efficiently store a plurality of related, but dispersed, ray data elements.

Although FIG. 1 shows load logic 124 that is configured to receive and process load instructions and separate store logic 126 that is configured to receive and process store instructions, in other embodiments the USC 104 may comprise common load/store logic that is configured to process both load and store instructions.

Ray Load (RLOAD) Instructions

In the examples described herein, the USC 104 (e.g. load logic 124) is configured to receive and process ray load instructions which allow for efficient retrieval of ray data from an external unit (e.g. RAC 112). Specifically, the USC 104 (e.g. load logic 124) is configured to receive and process ray load instructions that comprise information identifying a load group of a plurality of load groups (wherein each load group comprises a plurality of related ray data elements) and information identifying the ray data elements of that load group that are to be retrieved from the external unit (e.g. RAC 112). Each load group is predefined to include ray data elements that are often requested together by a ray tracing shader. Such instructions allow a ray tracing shader to efficiently load, with a single instruction, a plurality of ray data elements into the USC 104 storage 110.

Specifically, as described above, each ray in ray tracing is associated with ray data that comprises a plurality of individual ray data elements. In some cases, each ray data element is the same size (or has the same maximum size). In the examples described herein each ray data element has a maximum size of a dword (e.g. 32 bits). However, it will be evident to a person of skill in the art that this is an example only and that in other examples the ray data elements may have a different maximum size. Examples of ray data elements are shown in Table 1. It will be evident to a person of skill that the ray data elements of Table 1 are merely examples of ray data elements and that in other examples, there may be fewer ray data elements, more ray data elements, and/or a different combination of ray data elements.

TABLE 1

| Ray Data Element | Description |
|---|---|
| 1 ACC_STRUCT | Address of acceleration structure |
| 2 CD_GEOM_IN | The geometry index associated with the candidate data set |

TABLE 1-continued

| Ray Data Element | Description |
| --- | --- |
| 3 CD_INST_IN | The instance index associated with the candidate data set |
| 4 CD_PRIM_IN | The primitive index associated with the candidate data set |
| 5 CD_T | The candidate hit distance |
| 6 CM_GEOM_IN | The geometry index associated with the committed data set |
| 7 CM_INST_IN | The instance index associated with the committed data set |
| 8 CM_PRIM_IN | The primitive index associated with the committed data set |
| 9 CM_T | The committed hit distance |
| 10 DIRECTION_X | Ray direction X co-ordinate |
| 11 DIRECTION_Y | Ray direction Y co-ordinate |
| 12 DIRECTION_Z | Ray direction Z co-ordinate |
| 13 FLAGS | A collection of sub-fields/elements that can be read or written to |
| 14 LAUNCH_ID_X | X co-ordinate of the ray generation invocation in the ray's dispatch |
| 15 LAUNCH_ID_Y | Y co-ordinate of the ray generation invocation in the ray's dispatch |
| 16 LAUNCH_ID_Z | Z co-ordinate of the ray generation invocation in the ray's dispatch |
| 17 LAUNCH_SZ_X | The X component of the launch size associated with the ray's dispatch |
| 18 LAUNCH_SZ_Y | The Y component of the launch size associated with the ray's dispatch |
| 19 LAUNCH_SZ_Z | The Z component of the launch size associated with the ray's dispatch |
| 20 MISS_INDEX | Miss index - Used for shader binding index calculation, miss shader indexing, and call shader indexing |
| 21 NCM_GEOM_IN | The geometry index associated with the non-committed data set |
| 22 NCM_INST_IN | The instance index associated with the non-committed data set |
| 23 NCM_PRIM_IN | The primitive index associated with the non-committed data set |
| 24 NCM_T | The non-committed hit distance |
| 25 ORIGIN_X | Ray origin X co-ordinate |
| 26 ORIGIN_Y | Ray origin Y co-ordinate |
| 27 ORIGIN_Z | Ray origin Z co-ordinate |
| 28 PAYLOAD_0 | Payload 0 - Used to transfer data between different shader invocation |
| 29 PAYLOAD_1 | Payload 1 - Used to transfer data between different shader invocation |
| 30 PAYLOAD_2 | Payload 2 - Used to transfer data between different shader invocation |
| 31 SBT_OFFSET | Offset - Used as part of a shader binding index calculation used for hit group indexing |
| 32 SBT_STRIDE | Stride - Used as part of a shader binding index calculation used for hit group indexing |
| 33 TMIN | Represents the start of the ray extents before starting a complete hierarchy search |
| 34 U | U component of Barycentric co-ordinate used for fixed function intersection |
| 35 V | V component of Barycentric co-ordinate used for fixed function intersection |

In the examples described herein, multiple load groups (which may also be referred to as load spaces) of ray data elements are defined. Each load group of ray data elements comprises a subset of the ray data elements that can be associated with a ray. The load groups may be defined such that each load group comprises ray data elements that are likely to be requested together by one or more ray tracing shaders. For example, a shader performing intersection queries may only use geometrical information (e.g. origin and direction of the ray) so a load group may be defined that comprises ray data elements that represent geometrical information; and a shader that is used to process the intersection between a ray and a primitive (e.g. to determine a colour) may use additional ray data elements so a different load group may be defined that comprises ray data elements that represent geometry information and one or more additional ray data elements. Accordingly, the specific ray data elements that form a load group may depend on the configuration of the ray tracing shaders.

Reference is now made to FIG. 2 which shows an example set of load groups formed from the ray data elements of Table 1. In this example, there are seven load groups labelled RID, Primary, Launch Size, Trace, Query, Call and Debug. Each load group comprises one or more ray data elements which may be requested with a single RLOAD instruction. For example, the Primary load group comprises the PAYLOAD_0, PAYLOAD_1, PAYLOAD_2, LAUNCH_ID_X, LAUNCH_ID_Y and LAUNCH_ID_Z ray data elements. This means that a ray tracing shader can request combinations of the PAYLOAD_0, PAYLOAD_1, PAYLOAD_2, LAUNCH_ID_X, LAUNCH_ID_Y and LAUNCH_ID_Z ray data elements using a single RLOAD instruction. Similarly, the Debug load group comprises the NCM_T, NCM_INST_IN, NCM_PRIM_IN, NCM_GEOM_IN, MISS_INDEX, SBT_OFFSET, and SBT_STRIDE ray data elements. This means that a shader can request combinations of the NCM_T, NCM_INST_IN, NCM_PRIM_IN, NCM_GEOM_IN, MISS_INDEX, SBT_OFFSET, and SBT_STRIDE ray data elements with a single RLOAD instruction. It can be seen that a ray data element may form part of only one load group, or a ray data element may form part of more than one load group. For example, the FLAGS ray data element forms part of both the Trace load group and the Query load group. Accordingly, the load groups may not comprise disjoint subsets of ray data elements. In other words, two or more of the load groups may comprise overlapping subsets of ray data elements.

Figure 3:
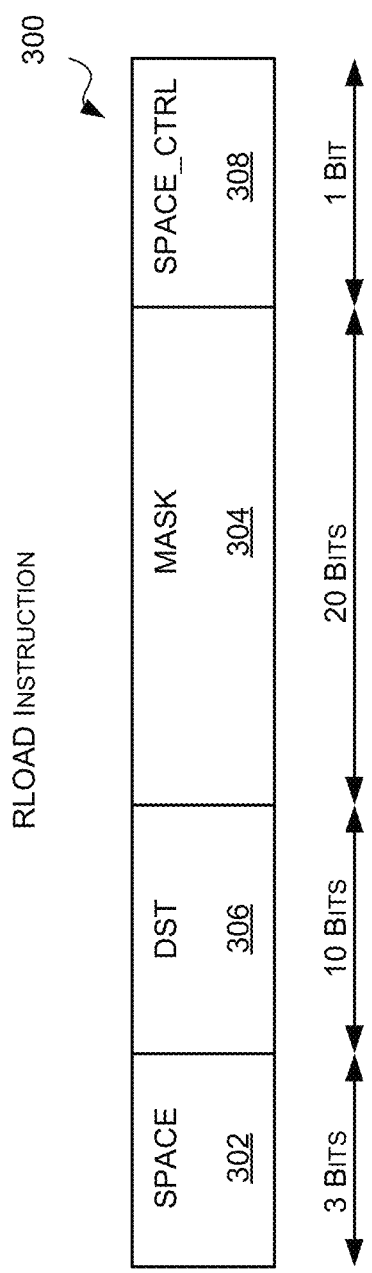
FIG. 3 is a schematic diagram of an example format for a ray load instruction.

Reference is now made to FIG. 3 which illustrates an example format for a ray load (RLOAD) instruction 300. The RLOAD instruction 300 comprises a load group identifier field 302, and a ray data element set identifier field 304. The RLOAD instruction 300 may optionally include one or more other fields, some of which will be discussed below.

The load group identifier field 302, which may also be referred to as the SPACE field or the group field, comprises information identifying one of the plurality of load groups. In some cases, each load group may be associated with a unique numerical identifier and a particular load group is identified in an RLOAD instruction by setting the SPACE field 302 to the unique numerical identifier associated with that particular load group. In these cases, the number of bits used for the SPACE field 302 may be selected based on the number of load groups. For example, the minimum number of bits for the SPACE field 302 may be $[\log_2(Y)]$ where Y is the number of load groups. Table 2 shows an example set of unique identifiers for the load groups shown in FIG. 2. In this example there are seven load groups, so the SPACE field 302 may comprise three bits. It will be evident to a person of skill in that art that this is an example only.

TABLE 2

| SPACE VALUE | SPACE |
| --- | --- |
| 0 | RID |
| 1 | Primary |
| 2 | Launch Size |
| 3 | Trace |
| 4 | Query |
| 5 | Call |
| 6 | Debug |

The ray data element set identifier field 304 comprises information to identify the ray data elements in the identified load group that are to be loaded into the USC 104. In some cases, the ray data elements of a load group may be divided into sets, wherein each set comprises one or more ray data elements, and only one ray data element of each set of a load group can be loaded into the USC 104 per RLOAD instruction. This means that if there are ten sets of ray data elements for a load group, only ten ray data elements of that load group can be loaded into the USC 104 per RLOAD instruction. FIG. 2 shows how the ray data elements of each load group therein may be divided into sets. For example, the ray data elements of the Primary load group of FIG. 2 are divided into six sets of ray data elements, wherein there is only one ray data element per set. Specially, set 0 comprises the PAYLOAD_0 ray data element, set 1 comprises the PAYLOAD_1 ray data element, set 2 comprises the PAYLOAD_2 ray data element, set 4 comprises the LAUNCH_ID_X ray data element, set 5 comprises the LAUNCH_ID_Y ray data element and set 6 comprises the LAUNCH_ID_Z ray data element. Since the Primary load group has six sets of ray data elements, up to six ray data elements in the Primary load group may be loaded into the USC 104 with a single RLOAD instruction.

In contrast, the ray data elements of the Trace load group are divided into 18 sets, and all of the sets comprise only a single ray data element except set 7. Specifically, set 7 comprises both the CM_T ray data element and the CD_T ray data element. Since only one ray data element from a set can be loaded into the USC 104 with a single RLOAD instruction, only one of the CM_T and CD_T ray data elements can be loaded into the USC 104 with a single RLOAD instruction when the Trace load group is identified.

In some cases, a set of ray data elements for a load group may only comprise one ray data element, or multiple mutually exclusive ray data elements for that load group. The term "mutually exclusive ray data elements for a load group" is used herein the mean ray data elements that would not be requested at the same time by a shader associated with that load group (e.g. a shader that is expected to refer to that load group). Two ray data elements may not be requested at the same time, for example, if one ray data element would be used at one point in the ray tracing processing and another ray data element would be used at another point in the ray tracing process. For example, a shader may either be working with candidate data or committed data, but not both. Accordingly, a candidate ray data element (CD_T) and the corresponding committed ray data element (e.g. CM_T) may be considered to be mutually exclusive. It will be evident to a person of skill in the art that this is an example only and that there may be other mutually exclusive ray data elements and there may be other reasons why ray data elements may be mutually exclusive. In some cases, two ray data elements may be mutually exclusive for one load group and the same two ray data elements may not be mutually exclusive for another load group.

In some cases, the ray data element set identifier field 304 may be implemented by a mask which comprise a plurality of bits and each set of ray data elements in a load group is associated with one of the bits. In these cases, the ray data element set identifier field 304 may be referred to as the MASK field. In some cases, a bit may be set to one value (e.g. '1') when a ray data element in the associated set is to be retrieved, and may be set to a different value (e.g. '0') if none of the ray data elements in the associated set is to be retrieved. Where an identified set comprises only one ray data element then setting the corresponding bit in the MASK field specifically identifies that ray data element. In this manner, the MASK field allows combinations of individual ray data elements in the same load group to be requested/retrieved at the same time.

How the ray data elements of a load group are divided into sets of ray data elements, and which sets of ray data elements are associated with which bits of the mask may be predefined. FIG. 2 shows an example mapping of sets to MASK bits. Specifically, sets 0, 1, 2, 4, 5 and 6 of the Primary load group are associated with bits 0, 1, 2, 4, 5, 6 of the mask respectively. Accordingly, if the SPACE field identifies the Primary load group, and bits 0, 1 and 2 of the MASK field are set then the PAYLOAD_0, PAYLOAD_1, and PAYLOAD_2 ray data elements are to be retrieved from the external unit (e.g. RAC 112) and loaded into the USC 104.

In some cases, the RLOAD instruction 300 may also comprise a destination (DST) field 306, that is used to identify which USC 104 storage 110 locations (e.g. registers) the identified ray data elements, once retrieved from the external unit (e.g. RAC 112), are to be stored. In some cases, the DST field 306 may identify the USC 104 storage 110 location (e.g. register) to which the first identified ray data element is to be written, and the identified ray data elements are written to contiguous memory locations (e.g. registers) starting at the identified memory location.

As described above, in some cases, a set may comprise more than one ray data element (such a set may be referred to herein as a multi-ray data element set). In such cases, setting the corresponding mask bit does not identify a particular ray data element to retrieve from the external unit (e.g. RAC 112). In such cases, the RLOAD instruction 300 may comprise a space control field 308, which may also be referred to as the SPACE_CTRL field, that comprises information identifying which ray data element of a multi-ray data element set is to be retrieved. For example, in FIG. 2, set 7 of the Trace group is a multi-ray data element set that comprises the CM_T ray data element and the CD_T ray data element. In this example, when the SPACE field identifies the Trace load group, and bit seven of the MASK field is set, the SPACE_CTRL field may be used to identify whether the CM_T ray data element is to be retrieved or the CD_T ray data element is to be retrieved. For example, the SPACE_CTRL field may comprise a single bit, which, when the SPACE and MASK fields are set as described, identifies whether the CM_T ray data element or the CD_T ray data element is to be retrieved. For example, the SPACE_CTRL field may be set to '1' if the CM_T ray data element is to be retrieved, and set to '0' if the CD_T ray data element is to be retrieved. Allowing multi-ray data element sets increases the number of combinations of ray data elements which can be retrieved with a single RLOAD instruction without increasing the number of mask bits.

In the example load groups shown in FIG. 2, there is only one load group (i.e. the Trace load group) which has a multi-ray data element set, and there is only one multi-ray data element set, however, it will be evident to a person of skill in the art that this is an example only and that in other examples, there may be more than one load group which has at least one multi-ray data element set, and one or more load groups may have more than one multi-ray data element set. In some cases, where at least one load group comprises more than one multi-ray data element set, the SPACE_CTRL field 308 may comprise more than one bit. For example, the SPACE_CTRL field 308 may comprise one bit for each multi-ray data element set. For example, if a load group comprises a first set comprising ray data element 0 and ray data element 1, and a second set comprising ray data element 2 and ray data element 3, then the SPACE_CTRL field may comprise a first bit which can be used to select between ray data elements 0 and 1, and a second bit which can be used to select between ray data elements 2 and 3. In other cases, where a load group comprises more than one multi-ray data element set, a single bit in the SPACE_CTRL field 308 can be used to select one element of each multi-ray data element set. For example, if a load group comprises a first set comprising ray data element 0 and ray data element 1, and a second set comprising ray data element 2 and ray data element 3, then the SPACE_CTRL field may comprise a first bit which, when set to one value (e.g. '0') selects the first ray data element in each multi-ray date element set (i.e. ray data elements 0 and 2), and when set to another value (e.g. '1') selects the second ray data element in each multi-ray data element set (i.e. ray data elements 1 and 3).

As described above, a USC 104 receives shader tasks from a scheduler. Each shader task specifies the data to be processed and the shader (e.g. program) to be used to process that data. In response to receiving a shader task, a USC 104 executes the identified shader against the identified data. A ray tracing shader task may be associated with a plurality of rays and the identified ray tracing shader can be applied to one or more of the plurality of rays. Accordingly, an RLOAD instruction that is run as part of a shader task is said to be associated with the plurality of rays associated with the shader task, and the ray data elements identified therein are to be retrieved from the external unit (e.g. RAC 112) for one or more of the rays associated with the RLOAD instruction.

As described in more detail below, not all of the rays associated with a ray tracing shader task may be 'active' for an RLOAD instruction executed as part of the shader task, and preferably only the ray data for the active rays is loaded into the USC 104 to avoid loading in unnecessary data. An 'active' ray for an instruction is a ray that the instruction applies to. Accordingly, in the methods described below it is determined which rays of the plurality of rays associated with the RLOAD instruction are active for the RLOAD instruction, and the ray data elements identified in an RLOAD instruction are retrieved for only the active rays. However, in other examples, instead of determining which of the rays associated with an RLOAD instruction are active it may be simpler to simply load in the identified ray data elements for all of the rays associated with the RLOAD instruction.

The active rays for an RLOAD instruction may be set at the shader task level or the instruction level. Specifically, some rays may be inactive for a ray tracing shader task such that they will be inactive for any RLOAD instruction executed as part of that ray tracing shader task. However, different RLOAD instructions that are executed as part of the same ray tracing shader task may have different active rays. For example, rays 1 and 2 associated with a ray tracing shader task may be active for a first RLOAD instruction that is executed as part of the ray tracing shader task, and rays 3 and 4 associated with the ray tracing shader task may be active for a second, different, RLOAD instruction that is executed as part of the ray tracing shader task.

Figure 4:
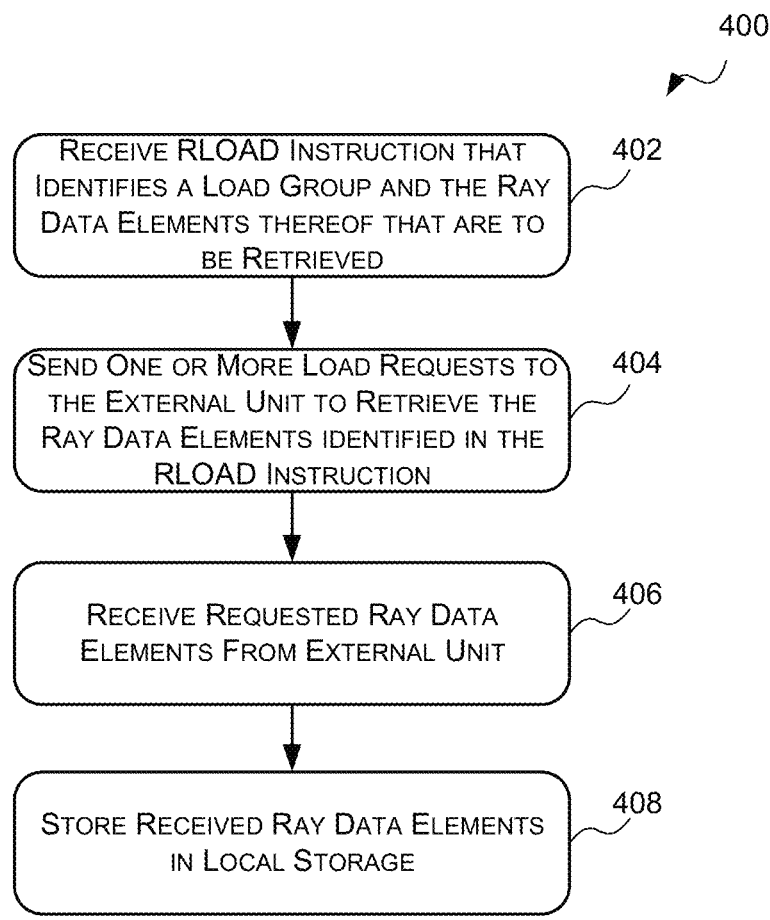
FIG. 4 is a flow diagram of an example method of processing a ray load instruction.

Reference is now made to FIG. 4 which illustrates an example method 400 of executing an RLOAD instruction at a USC 104. The method begins at block 402 where the USC 104 (e.g. load logic 124) receives an RLOAD instruction, such as that described with respect to FIGS. 2-3. As described above, an RLOAD instruction identifies a predefined load group of ray data elements (e.g. one of the load groups shown in FIG. 2) and the specific ray data elements of that load group that are to be retrieved from an external unit (e.g. RAC 112). After receiving the RLOAD instruction, the method 400 proceeds to block 404 where the USC 104 (e.g. load logic 124) sends one or more load requests to the external unit (e.g. RAC 112) which causes, for each of one or more rays associated with the RLOAD instruction (e.g. all or a subset of the plurality of rays associated with the RLOAD instruction), the identified ray data elements of the identified load group to be retrieved from the storage of the external unit (e.g. RAC 112 storage units 114, 116) and sent to the USC 104 (e.g. load logic 124). The method 400 then proceeds to blocks 406 and 408 where the USC 104 (e.g. load logic 124) receives the identified ray data elements for each of the one or more rays over the load interface 118, and stores the received ray data elements in the USC 104 storage 110.

The load interface 118 between the external unit (e.g. RAC 112) and the USC 104 may not be large enough to receive all of the requested ray data elements in the same cycle. Accordingly, the USC 104 may receive the requested ray data elements over a plurality cycles. The set of one or more ray data elements that are received in a cycle may be referred to as a load transaction. In some cases, the number of ray data elements that may be received in the same cycle (e.g. as part of the same load transaction) is based on the size of the load interface 118 and the size of the ray data elements. The size of the load interface 118 is defined as the amount of data that can be transmitted at the same time. For example, if the load interface 118 is 128 bits wide and each ray data element is a dword (i.e. 32 bits) then four ray data elements may be received in the same cycle (e.g. in the same load transaction).

In some cases, the USC 104 may be configured to implement block 404 of the method 400 of FIG. 4 (i.e. sending one or more load requests to the external unit to retrieve the identified ray data elements) by converting the received RLOAD instruction into a plurality of load transactions and sending a separate load transaction request to the external unit (e.g. RAC 112) for each load transaction. In other words, the USC 104 may be configured to expand a received RLOAD instruction into a plurality of load transactions. For example, if it will take four load transactions to transmit the ray data elements identified in an RLOAD instruction from the external unit (e.g. RAC 112) to the USC 104, then the USC 104 (e.g. load logic 124) may generate and transmit four load transaction requests to the external unit (e.g. RAC 112). The USC 104 then receives four load transactions with the identified ray data elements.

In some cases, there may be one or more types of load groups, and the technique used to convert an RLOAD instruction into a plurality of load transactions may be based on the type of load group identified in the RLOAD instruction. For example, the one or more types of load groups may include one or more of per ray (or per instance) load groups, and per ray block load groups. Load transactions for a per ray load group may comprise only ray data elements associated with the same ray (e.g. different ray data elements associated with one ray). In contrast, load transactions for a per ray block load group may comprise the same ray data element for multiple rays. An example method of converting an RLOAD instruction that relates to a per ray load group into a plurality of load transactions is described with respect to FIG. 5 and an example method of converting an RLOAD instruction that relates to a per ray block load group into a plurality of load transactions is described with respect to FIG. 7.

Having load transactions include ray data elements from the same ray may allow for more efficient transfer of ray data elements over the load interface 118 compared to having load transactions that include the same ray data element for one or more rays, where, for example, the active rays of the plurality of rays associated with an RLOAD instruction are dispersed amongst the plurality of rays. For example, as described in more detail below, a ray generation shader task may be associated with a plurality of rays (e.g. it may generate a plurality of rays), and after those rays are generated a hierarchy search may be performed to determine which rays are a "hit" and which are a "miss". A miss shader task is then associated with the plurality of rays, but the miss shader task may only need to operate on those rays in the plurality of rays that are a "miss" (which may be referred to as the active rays for an RLOAD instruction executed as part of the miss shader task). Similarly, a hit shader task is associated with the plurality of rays, but the hit shader task may only need to operate on those rays in the plurality of rays that are a "hit" (which may be referred to as the active rays for an RLOAD instruction executed as part of the hit shader task). If the plurality of rays are divided into blocks, and a load transaction can only comprise the same ray data element for rays in the same block, then if only one ray in each block of rays is active, then each load transaction will only comprise one ray data element (which is not efficient use of the load interface 118). This means that if there are a lot of ray data elements per ray that are to be loaded into the USC 104 this may require many load transactions to load in all of the required ray data elements.

If, however, the ray data elements for the same ray can be packed together in a load transaction (and non-active rays skipped), each load transaction can comprise more ray data elements which means the ray data elements can be transferred across the load interface 118 over fewer load transactions (which is more efficient use of the load interface 118). However, this method isn't as efficient if there are only a few ray data elements (e.g. less than the maximum number of ray data elements per load transaction) in the load group because a load transaction could never be full. Therefore, in some cases, the per ray load groups may be those load groups with more than a predetermined number (e.g. 1 or 2) of ray data elements and the per ray block load groups may be those load groups with the predetermined number, or fewer than the predetermined number, of ray data elements.

As described above, each load transaction for a per ray load group may only comprise ray data elements that relate to the same ray. For example, a load transaction for a per ray load group may comprise the ORIGIN_X, ORIGIN_Y and ORIGIN_Z ray data elements for the same ray. In contrast, a load transaction for a per ray load group may not comprise a CM_T ray data element for a first ray and a CM_T ray data element for a second ray. In some cases, the ray data elements of a per ray load group are divided into one or more blocks and a load transaction can comprise only ray data elements in the same block. In these cases, when the USC 104 (e.g. load logic 124) receives an RLOAD instruction in which a per ray load group is identified, the USC 104 (e.g. load logic 124) may be configured to convert the received RLOAD instruction into a plurality of load transactions by: determining which blocks of the identified load group comprise at least one identified ray data element, and for each block that comprises at least one identified ray data element, generating and transmitting a load transaction request (for each (active) ray associated with the RLOAD instruction) for the identified ray data elements in that block. Accordingly, in this RLOAD conversion technique, load transaction requests are not issued for empty blocks of the identified load group—i.e. a load transaction request is not generated for blocks of the identified load group that do not comprise at least one identified ray data element. However, a load transaction request is generated, for each of one or more rays, for each block that comprises at least one identified ray data element.

For example, let each of the example load groups shown in FIG. 2, except the RID load group, be a per ray load group. It can be seen in FIG. 2 that the ray data elements of each of these load groups have been divided into blocks wherein the ray data elements in a block may form part of the same load transaction. For example, the ray data elements of the Primary load group have been divided into two blocks (blocks 0 and 1), the ray data elements of the Launch Size load group form one block (block 0), the ray data elements of the Trace load group have been divided into five blocks (blocks 0, 1, 2, 3 and 4), and the ray data elements of the Query load group have been divided into three blocks (blocks 0, 1, and 2) etc.

Since there is a maximum number, M, of ray data elements that can be transmitted as part of a single load transaction, only M ray data elements in a block can be transmitted as part of a single transaction. Therefore, each block may comprise a maximum of M sets of ray data elements, wherein each set of ray data elements comprises a single ray data element or a set of mutually exclusive ray data elements. This means that a transaction can comprise a ray data element from each set associated with a block. In the examples described herein, M is four (i.e. four ray data elements can be transmitted as part of a single load transaction) so each of the blocks shown in FIG. 2 comprise a maximum of four sets of ray data elements. For example, the first block of the Trace load group comprises four sets of ray data elements (sets 0 to 3), wherein each set comprises a single ray data element—i.e. set 0 that comprises only the ORIGIN_X ray data element, set 1 that comprises only the ORIGIN_Y ray data element, set 2 that comprises only the ORIGIN_Z ray data element, and set 3 that comprises only the DIRECTION_X ray data element; and the second block of the Trace load group comprises four sets of ray data elements (sets 4 to 7), wherein three of the sets comprise a single ray data element and the fourth set comprises two mutually exclusive ray data elements—i.e. set 4 comprises only the DIRECTION_Y ray data element, set 5 comprises only the DIRECTION_Z ray data element, set 6 comprises only the TMIN ray data element, and set 7 comprises the mutually exclusive CM_T and CD_T ray data elements.

As described above, in some cases the ray data element set identifier field 304 may be implemented as a mask (i.e. as a MASK field) which comprises a plurality of bits and sets of ray data elements of each load group are associated with specific bits of the mask. In such cases, the ray data elements in a block may be the sets of ray data elements associated with a contiguous set of mask bits (e.g. M mask bits). For example, as shown in FIG. 3, the first block of each load group may comprise the sets of ray data elements associated with the first four mask bits (e.g. bits 0 to 3), the second block of each load group may comprise the sets of ray data elements associated with the next four mask bits (e.g. bits 4 to 7), the third block of each load group may comprise the sets of ray data elements associated with the next four mask bits (e.g. bits 8 to 11) and so on. As described in more detail below, this may allow the USC 104 (e.g. load logic 124) to quickly and efficiently determine from the MASK field bits of a RLOAD instruction which blocks of the identified load group comprise at least one ray data element that has been requested/identified—and thus which blocks a load transaction request is to be generated for.

As described above, in some cases, the external unit (RAC 112) may have multiple storage units 114, 116 and/or one or more of the storage units 114, 116 may be subdivided into a plurality of sections and different ray data elements may be stored in different storage units and/or different sections of a storage unit. In some cases, the sets of ray data elements for a load group may be arranged into blocks so that the ray data elements that are stored in the same storage unit 114, 116 and/or same section of that storage unit are in the same block to make it more efficient for the remote unit (e.g. RAC 112) to generate load transactions. Specifically, a load transaction comprising ray data elements in the same storage unit and/or same section thereof is faster and easier to generate than a load transaction comprising ray data elements from different storage units and/or sections thereof. For example, since the LAUNCH_ID_X, LAUNCH_ID_Y, LAUNCH_ID_Z ray data elements are stored in the same storage unit 114, 116 and the same section thereof they are placed in the same block of the Primary load group. As shown in FIG. 2 this may mean that there is a gap in the numbering of the sets of ray data elements—e.g. there is no ray data element set 3 in the Primary load group—however, this may increase the efficiency and speed at which the remote unit (e.g. RAC 112) can generate load transactions.

Figure 5:
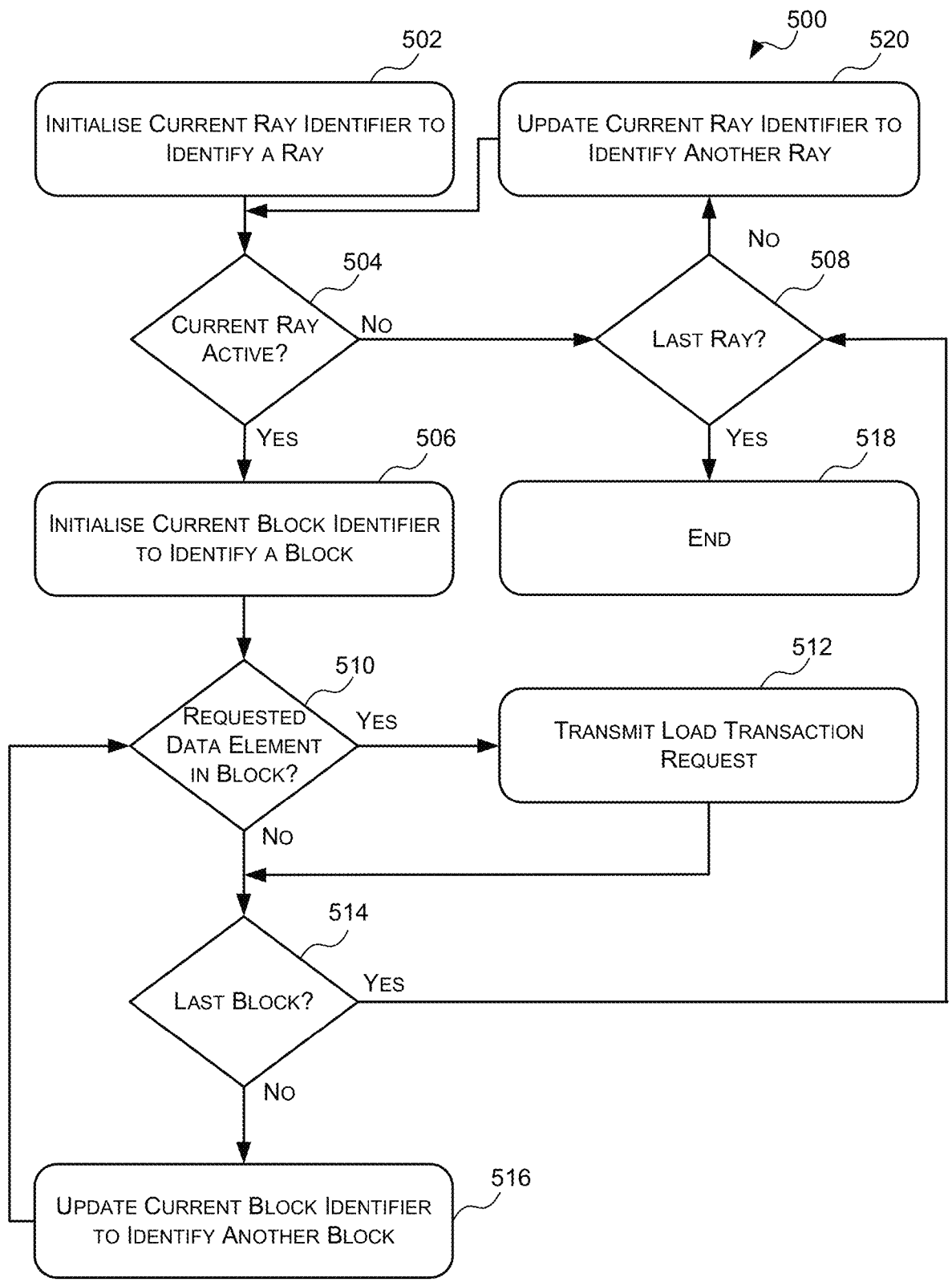
FIG. 5 is a flow diagram of a first example method of converting a ray load instruction into a plurality of load transaction requests.

Reference is now made to FIG. 5 which illustrates an example method 500, which may be implemented by a USC 104 (e.g. load logic 124), to convert an RLOAD instruction, that identifies a per ray load group, into a plurality of load transactions. The method 500 begins at block 502 where the USC 104 (e.g. load logic 124) initialises a current ray identifier (which may also be referred to as the instance identifier). The current ray identifier identifies one ray of the plurality of rays associated with the RLOAD instruction. The ray identified by the current ray identifier may be referred to as the current ray. The current ray identifier may be initialised to identify the first ray associated with the RLOAD instruction. In some cases, each of the plurality of rays associated with the RLOAD instruction may be identified by a unique value. In some cases, the current ray identifier may be a counter that is initialised to a predetermined value (e.g. 0). Once the current ray identifier has been initialised, the method 500 proceeds to block 504.

At block 504, the USC 104 (e.g. load logic 124) determines whether the current ray is active. In some cases, the USC 104 may receive, along with the RLOAD instruction, information identifying which rays associated with the RLOAD instruction are active. If it is determined that the current ray is active, then the method 500 proceeds to block 506. If, however, it is determined that the current ray is not active then the method 500 proceeds directly to block 508.

At block 506, the USC 104 (e.g. load logic 124) initialises a current block identifier to identify a block (e.g. the first block) of the identified load group. The block identified by the current block identifier may be referred to as the current block. In some cases, the current block identifier may take the form of a counter and the counter may be initialised to a predetermined value (e.g. 0). Once the current block identifier has been initialised, the method 500 proceeds to block 510.

At block 510, the USC 104 (e.g. load logic 124) analyses the RLOAD instruction to determine whether at least one ray data element in the current block has been requested/identified. Where the RLOAD instructions comprises a MASK field 304 and a block of a load group corresponds to a contiguous block of mask bits, the USC 104 (e.g. load logic 124) may be configured to analyse the mask bits that correspond to the identified block to determine if any of them are set. Where RT_USC_DATA_WIDTH is the width (in bits) of the load interface 118, RAY_DATA_ELEMENT_WIDTH is the width (in bits) of each ray data element, BLOCK is the current block, and MASK is the mask field of an RLOAD instruction, then the bits that relate to the current block may be bits ((RT_USC_DATA_WIDTH/RAY_DATA_ELEMENT_WIDTH)*(BLOCK+1)-1) to (RT_USC_DATA_WIDTH/RAY_DATA_ELEMENT_WIDTH)*(BLOCK). If it is determined that at least one ray data element in the current block has been requested/identified, the method 500 proceeds to block 512 where a load transaction request is generated and sent to the external unit (e.g. RAC 112). If, however, it is determined that none of the ray data elements in the current block have been requested then the method proceeds to block 514.

At block 512, the USC 104 (e.g. load logic 124) generates and sends a load transaction request to the external unit (e.g. RAC 112) for the requested/identified ray data elements in the current block of the identified load group, for the current ray. In some cases, the load transaction request may comprise (i) information identifying the current ray; (ii) information identifying the load group; (iii) information identifying the current block; and (iv) information identifying the requested/identified ray data elements of that block.

Figure 6:
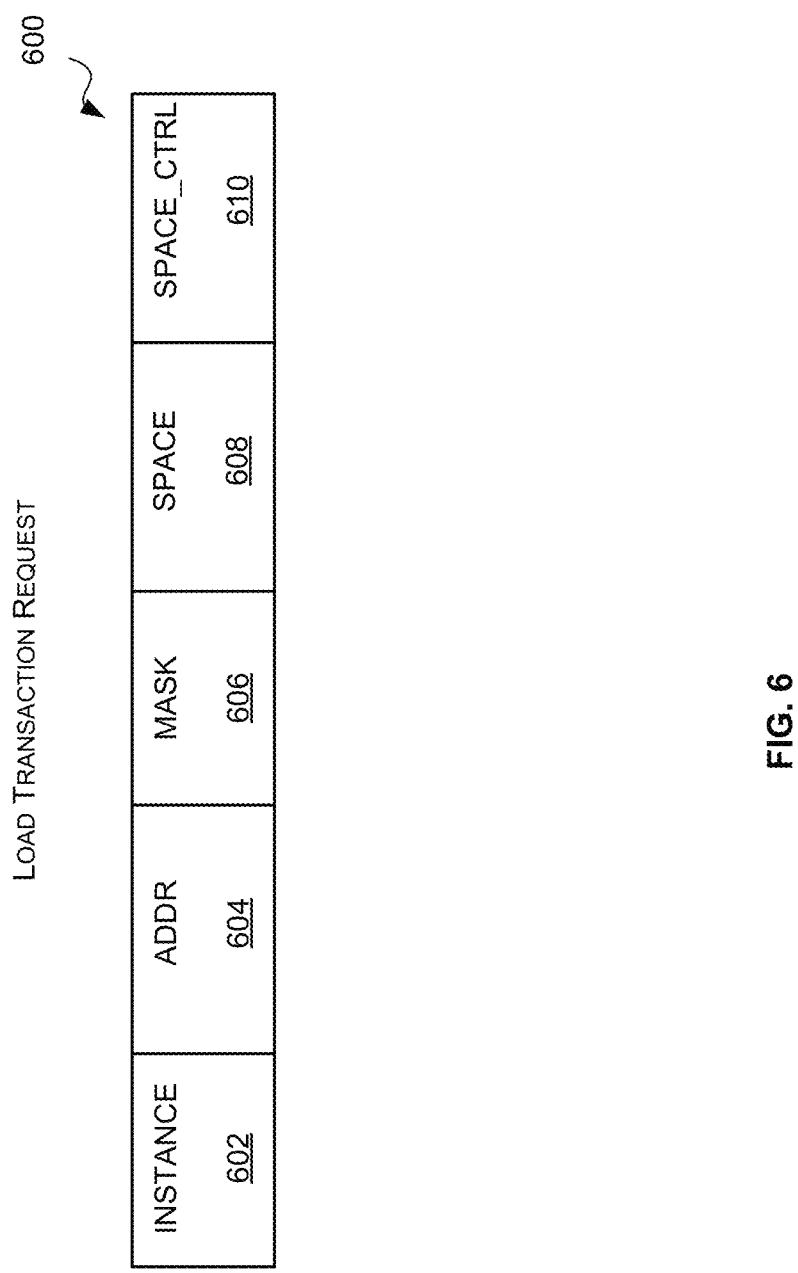
FIG. 6 is a schematic diagram of an example format for a load transaction request.

FIG. 6 shows an example format for a load transaction request 600 when the identified load group is a per ray load group. The example load transaction request 600 comprises: a ray identifier field 602, a block identifier field 604, a ray data element set identifier field 606, and a load group identifier field 608. The ray identifier field 602 (which may also be referred to as the INSTANCE field) identifies the ray that the request relates to, and may be set to the value of the current ray identifier. The block identifier field 604 (which also may be referred to as the ADDR field) identifies the block (of the identified load group) that the request relates to. The block identifier field 604 may be set to the value of the current block identifier. The ray data element set identifier field 606 (which, when implemented as a mask, may be referred to as the MASK field) identifies the sets of ray data elements in the block from which a ray data element is to be retrieved. The ray data element set identifier field 606 may comprise the bits of the RLOAD MASK field that relate to the identified block (e.g. bits ((RT_USC_DATA_WIDTH/RAY_DATA_ELEMENT_WIDTH)*(BLOCK+1)-1) to (RT_USC_DATA_WIDTH/RAY_DATA_ELEMENT_WIDTH)*(BLOCK)). The load group identifier field 608 (which may also be referred to as the SPACE field) identifies the load group. The load group identifier field 608 may be configured to include the load group identifier information in the RLOAD instruction. Where the RLOAD instruction comprises a SPACE_CTRL field, the load transaction request 600 may also comprise a SPACE_CTRL field 610 which includes the SPACE_CTRL information from the RLOAD instruction. It will be evident to a person of skill in the art that this is an example only and that in other examples a load transaction request may take a different form.

Returning to FIG. 5, upon receiving a load transaction request, the external unit (e.g. RAC 112) determines, from the load group, block and ray data element information the location of the requested ray data elements in storage (e.g. RAC 112 storage units 114, 116), retrieves the requested ray data elements from storage and transmits the requested ray data elements to the USC 104 as part of a load transaction. In particular, the external unit (e.g. RAC 112) may comprise information that maps load groups, and individual ray data elements thereof to storage locations.

Once the USC 104 has generated and sent a load transaction request to the external unit (e.g. RAC 112), the method 500 proceeds to block 514.

At block 514, the USC 104 (e.g. load logic 124) determines whether the current block is the last block (i.e. whether the load logic 124 has checked all blocks). Where the block identifier is implemented as a counter that is initialised to 0, the USC 104 may determine whether the current block is the last block by comparing the block counter to (the maximum number of blocks per load group–1). Where the ray data element set identifier field is implemented as a MASK field, the maximum number of blocks per load group may be equal to the maximum number of bits in the MASK field divided by the maximum number of ray data elements per load transaction (e.g. RT_USC_DATA_WIDTH/RAY_DATA_ELEMENT_WIDTH). For example, where the MASK field comprises 20 bits and there are a maximum of 4 ray data elements per load transaction, there will be a maximum of 5 blocks per load group. If it is determined that the current block is the last block, then the method 500 proceeds to block 508. If, however, it is determined that the current block is not the last block then the method 500 proceeds to block 516.

At block 516, the USC 104 (e.g. load logic 124) updates (e.g. increments) the current block identifier to identify another (e.g. the next) block. Once the current block identifier has been updated, the method 500 proceeds back to block 510 where the USC 104 (e.g. load logic 124) determines whether any of the ray data elements associated with the new current block have been requested.

At block 508, the USC 104 (e.g. load logic 124) determines whether the current ray is the last ray associated with the RLOAD instruction (e.g. whether all rays associated with the RLOAD instruction have been assessed). Where the current ray identifier is implemented as a counter that is initialised to 0, the USC 104 (e.g. load logic 124) may determine whether the current ray is the last ray by comparing the current ray counter to (the maximum number of rays associated with an RLOAD instruction–1). In some cases, the maximum number of rays associated with an RLOAD instruction may be 128. However, it will be evident that this is an example only and that in other examples there may be a different number of rays that may be associated with an RLOAD instruction. If it is determined that the current ray is the last ray associated with the RLOAD instruction, then the method 500 ends 518. If, however, it is determined that the current ray is not the last ray associated with the RLOAD instruction, then the method 500 proceeds to block 520.

At block 520, the current ray identifier is updated (e.g. the current ray counter is incremented) to identify another (e.g. the next) ray. Once the current ray identifier has been updated, the method 500 proceeds back to block 504.

As described above, each load transaction for a per ray block load group may only comprise the same ray data element for multiple rays. For example, a load transaction for a per ray block load group may comprise a CM_T ray data element for a first ray and a CM_T ray data element for a second ray. In contrast, a load transaction for a per ray block load group may not comprise ORIGIN_X, ORIGIN_Y and ORIGIN_Z ray data elements for one ray. In some cases, the rays associated with an RLOAD instruction may be divided into blocks and a load transaction for a per ray block load group can only comprise ray data elements that relate to rays in the same block. The number of rays in a block may be based on the maximum number of ray data elements in a load transaction. For example, if a load transaction can comprise up to four ray data elements, the rays associated with an RLOAD instruction may be divided into blocks of four. In these cases, when the USC 104 (e.g. load logic 124) receives an RLOAD instruction in which a per ray block load group is identified, the USC 104 (e.g. load logic 124) may be configured to convert the received RLOAD instruction into a plurality of load transactions by: determining which ray blocks comprise at least one active ray, and for each block that comprises at least one active ray, generating and transmitting a load transaction request for an identified ray data element in the RLOAD instruction. This process may be repeated for each identified ray data element in the RLOAD instruction. Accordingly, in this RLOAD conversion technique, load transaction requests may not be generated and transmitted for inactive ray blocks—i.e. a load transaction is not generated for a ray block that does not comprise any active rays.

Figure 7:
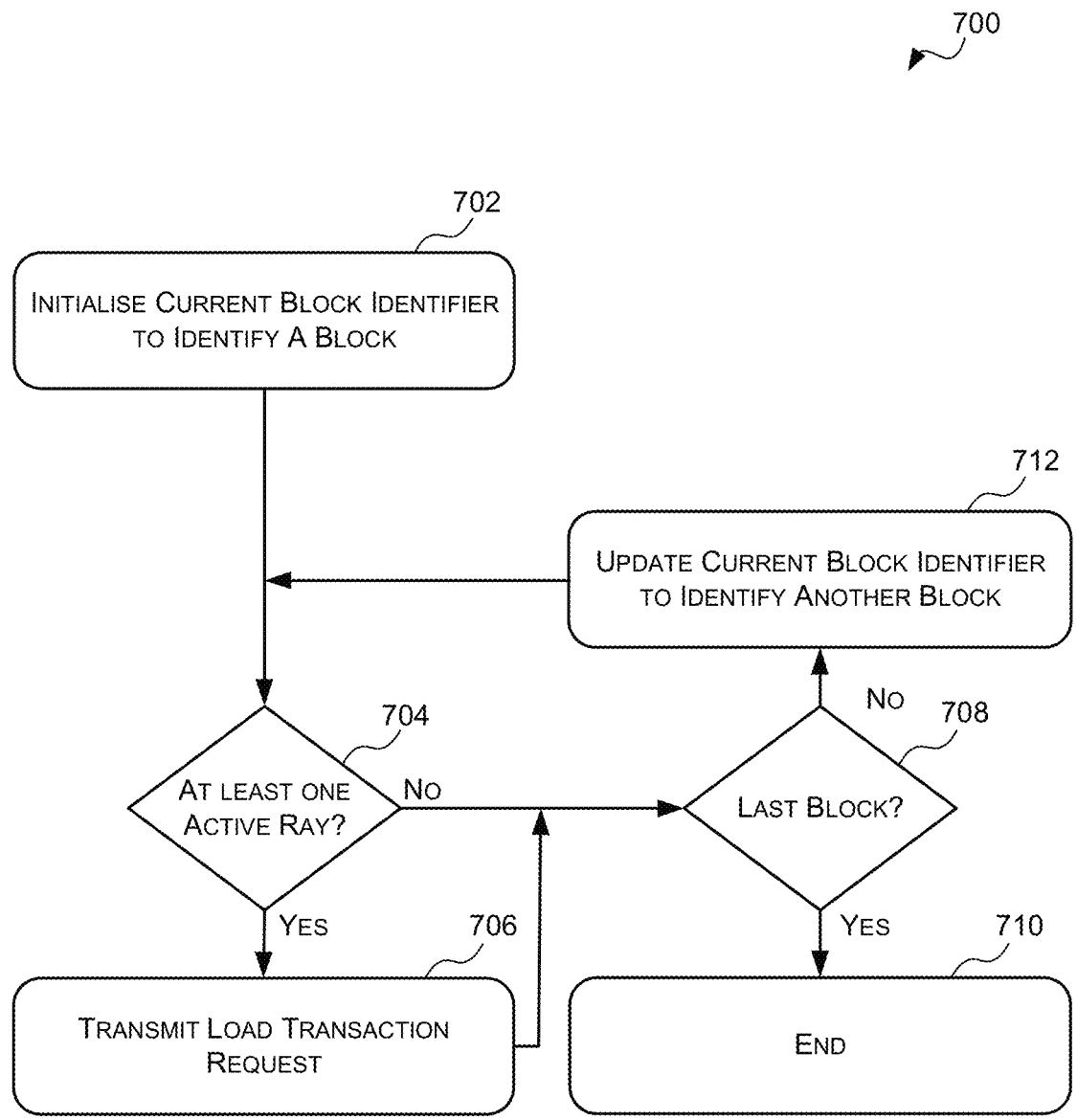
FIG. 7 is a flow diagram of a second example method of converting a ray load instruction into a plurality of load transactions.

Reference is now made to FIG. 7 which illustrates an example method 700, which may be implemented by a USC 104 (e.g. load logic 124), to convert an RLOAD instruction, that identifies a per ray block load group, into a plurality of load transactions. In this example, it is assumed that the per ray block load group comprises a single ray data element. However, if a per ray block load group comprises multiple ray data elements, the method 700 may be repeated for each ray data element that is identified in the RLOAD instruction. The method 700 begins at block 702 where the USC 104 (e.g. load logic 124) initialises a current ray block identifier. The current ray block identifier identifies a block of rays associated with the RLOAD instruction. The block of rays identified by the current block identifier may be referred to herein as the current ray block. The current ray block identifier may be initialised to identify the first ray block associated with the RLOAD instruction. In some cases, each of the plurality of ray blocks may be identified by a unique value. In some cases, the current ray block identifier may be a counter that is initialised to a predetermined value (e.g. 0). Once the current ray block identifier has been initialised, the method 700 proceeds to block 704.

At block 704, the USC 104 (e.g. load logic 124) determines whether the current ray block comprises at least one active ray. As noted above, along with the RLOAD instruction the USC 104 (e.g. load logic 124) may receive information indicating which rays are active for the RLOAD instruction. If it is determined that the current ray block comprises at least one active ray, then the method 700 proceeds to block 706. If, however, it is determined that the current ray block does not comprise any active rays then the method 700 proceeds directly to block 708.

At block 706, the USC 104 (e.g. load logic 124) generates and sends a load transaction request to the external unit (e.g. RAC 112) for a particular ray data element (i.e. the ray data element in the identified load group) for each of the active rays in the current ray block. In some cases, the load transaction request comprises (i) information identifying the ray block; (ii) information identifying the active rays in the ray block; and (iii) information identifying the load group (where the load group comprises only one ray data element this also identifies the ray data element).

The load transaction request may take the form shown in FIG. 6. However, in this case the ray identifier field 602 may be used to identify the ray block by, for example, identifying the first ray in the block. The ray identifier field 602 may be set to the current ray block identifier*the number of rays per block. The block identifier field 604 may not be used or may be set to zero. The ray data element set identifier field 606 may be used to identify the rays of the identified ray block that are active. In some cases, the ray data element set identifier field 606 may be implemented as a mask which has a bit for each ray in the ray block. A bit may be set to one value (e.g. '1') when the corresponding ray is active, and set to a different value (e.g. '0') when the corresponding ray is not active. Like the per ray load group load transaction request, the load group identifier field 608 identifies the load group identified in the RLOAD instruction. The load group identifier field 608 may be configured to include the load group identifier information from the RLOAD instruction. Where the RLOAD instruction comprises a SPACE_CTRL field the load transaction request may also comprise a SPACE_CTRL field 610 which includes the SPACE_CTRL information from the RLOAD instruction.

Upon receiving a load transaction request, the external unit (e.g. RAC 112) determines, from the ray block, ray active, and load group information the location of the requested ray data elements in storage (e.g. RAC 112 storage units 114, 116), retrieves the requested ray data elements from storage and transmits the requested ray data elements to the USC 104 as part of a load transaction. In particular, the external unit (e.g. RAC 112) may comprise information that maps load groups, and individual ray data elements thereof to storage locations.

Once the USC 104 has sent a load transaction request to the external unit (e.g. RAC 112), the method 700 proceeds to block 708.

At block 708, the USC 104 (e.g. load logic 124) determines whether the current ray block is the last block of rays (e.g. whether all blocks of rays have been assessed). Where the ray block identifier is implemented as a counter that is initialised to 0, the USC 104 may determine whether the current ray block is the last ray block by comparing the ray block counter to (the maximum number of ray blocks−1). If it is determined that the current ray block is the last ray block, then the method 700 ends 710. If, however, it is determined that that the current ray block is not the last ray block then the method 700 proceeds to block 712.

At block 712, the current ray block identifier is updated (e.g. incremented) to identify another (e.g. the next) block of rays. Once the current ray block identifier has been updated, the method 700 proceeds back to block 704.

In some cases, before executing block 404 of the method 400 of FIG. 4 (i.e. before sending one or more load requests to the external unit (e.g. RAC 112) to retrieve the ray data elements identified in the RLOAD instruction), the USC 104 (e.g. load logic 124) may be configured to perform one or more safety checks on the RLOAD instruction. For example, prior to sending load transaction requests to the external unit (e.g. RAC 112), the USC 104 (e.g. load logic 124) may be configured to verify that enough USC 104 storage 110 has been allocated for storing the ray data elements identified in the RLOAD instruction. This verification is performed to ensure that the USC 104 storage 110 does not get corrupted by writing to addresses out of the allocated region. In some cases, the USC 104 may be configured to receive (in addition) to the RLOAD instruction, information indicating the amount of storage allocated per ray/instance, and the USC 104 may be configured to determine whether enough USC 104 storage 110 has been allocated by comparing the amount of storage 110 allocated per ray/instance to the number of ray data elements requested per ray/instance. Where the ray data element set identifier field is implemented as a mask, the USC 104 (e.g. load logic 124) may determine the number of ray data elements requested per ray by counting the number of bits in the MASK field of the RLOAD instruction that indicate that a ray data element has been requested. If the number of ray data elements requested per ray is larger than the amount of storage 110 allocated per ray, then there is an error, and an exception may be generated.

Ray Store (RSTORE) Instructions

In the examples described herein, the USC 104 (e.g. store logic 126) is configured to receive and process ray store instructions which allow for efficient writing of ray data to an external unit (e.g. RAC 112). Specifically, the USC 104 (e.g. store logic 126) is configured to receive and process ray store instructions that comprise information identifying a store group of a plurality of store groups (wherein each store group comprises a subset of ray data elements) and information identifying the ray data elements of that store group that are to be written to the external unit (e.g. RAC 112). Such instructions allow a ray tracing shader to efficiently identify, with a single instruction, a plurality of, potentially dispersed, ray data elements to be written to an external unit (e.g. RAC 112).

Each store group of ray data elements comprises a subset of the ray data elements that can be associated with a ray. The store groups may be defined such that each store group comprises ray data elements that are likely to be generated and stored together by a ray tracing shader.

Reference is now made to FIG. 8 which shows an example set of store groups formed from the ray data elements of Table 1. In this example, there are three store groups labelled Trace, Query and Call. Each store group comprises one or more ray data elements which may be stored in an external unit (e.g. RAC 112) with a single RSTORE instruction. For example, the Trace store group comprises the ORIGIN_X, ORIGIN_Y, ORIGIN_Z, DIRECTION_X, DIRECTION_Y, DIRECTION_Z, ACC_STRUCT, NCM_T, TMIN, CM_T, CD_T, FLAGS, SBT_OFFSET, SBT_STRIDE, MISS_INDEX, PAYLOAD_0, PAYLOAD_1 and PAYLOAD_2 ray data elements. This means that a shader can write combinations of these ray data elements to an external unit (e.g. RAC 112) with a single RSTORE instruction. Similarly, the Call store group comprises the MISS_INDEX, PAYLOAD_0, PAYLOAD_1, PAYLOAD_2, ORIGIN_X, ORIGIN_Y, ORIGIN_Z, DIRECTION_X, DIRECTION_Y, DIRECTION_Z, NCM_T, CM_T, TMIN, CD_T, ACC_STRUCT, U and V ray data elements. This means that a shader can write combinations of these ray data elements to an external unit (e.g. RAC 112) with a single RSTORE instruction. It can be seen that a ray data element may form part of only one store group, or a ray data element may form part of more than one store group. For example, the U and V ray data elements are only part of the Call store group, and the ORIGIN_X ray data element belongs to the Trace, Query and Call store groups. Accordingly, multiple store groups may comprise overlapping subsets of ray data elements.

It can be seen that in the examples shown herein the load groups (shown in FIG. 2) are different than the store groups (shown in FIG. 8). This may be beneficial when the ray data elements generated by ray tracing shaders are different to the ray data elements consumed or processed by ray tracing shaders. However, it will be evident to a person of skill in the art that this is an example only, and that in other examples there may be a single set of groups of ray data elements that are used for RLOAD and RSTORE instructions.

Figure 9:
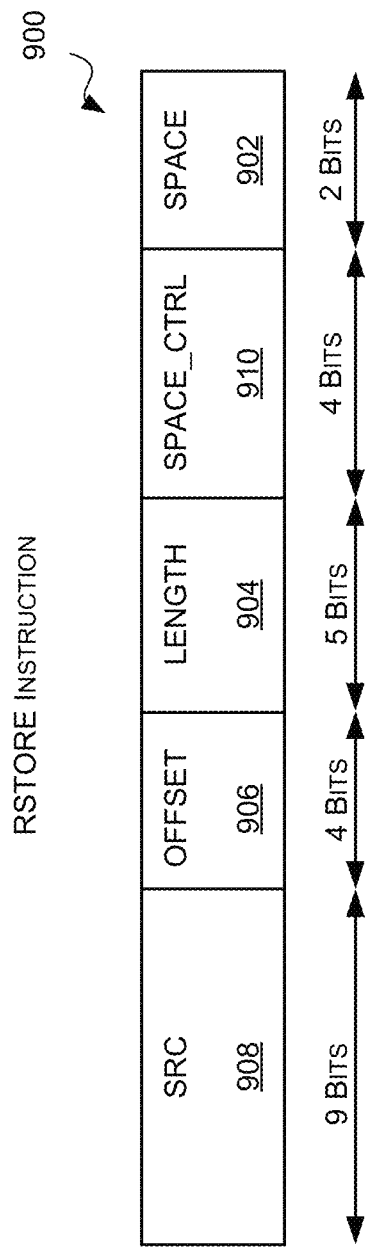
FIG. 9 is a schematic diagram of an example format for a ray store instruction.

Reference is now made to FIG. 9 which illustrates an example format for a ray store (RSTORE) instruction 900 for storing ray data elements in an external unit (e.g. RAC 112). The RSTORE instruction 900 comprises a store group identifier field 902, a length (LENGTH) field 904 and an offset (OFFSET) field 906. The RSTORE instruction 900 may optionally include one or more other fields, some of which are discussed below.

The store group identifier field 902 of the RSTORE instruction 900, which may also be referred to as the SPACE field or the group field, comprises information identifying one of the plurality of predefined store groups. In some cases, each store group may be associated with a unique numerical identifier and a particular store group is identified in an RSTORE instruction 900 by setting the SPACE field 902 to the unique numerical identifier associated with that particular store group. In these cases, the number of bits used for the SPACE field 902 may be selected based on the number of store groups. For example, the minimum number of bits for the SPACE field 302 may be [log$_2$(S)] where S is the number of store groups. Table 3 shows an example set of unique identifiers for the store groups shown in FIG. 8. In this example there are three store groups, so the SPACE field may comprise two bits. It will be evident to a person of skill in that art that this is an example only.

TABLE 3

| SPACE VALUE (decimal) | SPACE |
|---|---|
| 0 | Trace |
| 1 | Query |
| 2 | Call |

Together the offset and length fields 906, 904 identify the ray data elements of the identified store group that are to be stored in the external unit (e.g. RAC 112). While the ray data element set identifier field 304 of the example RLOAD instruction described above with respect to FIG. 3 allows combinations of individual ray data elements in the identified load group to be identified (and thus retrieved from the external unit), in the example RSTORE instruction 900 shown in FIG. 9 only a contiguous group of ray data elements in a store group may be identified.

Specifically, the ray data elements of a store group may be divided into sets, wherein each set comprises one or more ray data elements, and only one ray data element of a set can be written to the external unit per RSTORE request. This means that if there are ten sets of ray data elements for a store group, only ten ray data elements of that store group can be stored per ray store instruction. In some cases, a set of ray data elements may only comprise one ray data element, or multiple mutually exclusive ray data elements for the store group. Mutually exclusive ray data elements for a store group are ray data elements that would not be written together by a shader expected to use the store group. It is noted that ray data elements may be mutually exclusive for some store groups, but not mutually exclusive for other store groups.

Each set of ray data elements of a store group is then associated with information (e.g. a value or offset) which indicates the order or position of that set in the store group. A contiguous group of ray data elements in a store group may then be identified by identifying the first set of ray data elements which comprises a ray data element that is to be written to the external unit, and the total number of ray data elements that are to be written. In the example shown in FIG. 9 the offset field 906 comprises information identifying the position (e.g. offset) of the first set of ray data elements that comprises a ray data element to be written to the external unit, and the length field 904 comprises information indicating the number of ray data elements to be written.

How the ray data elements of a store group are divided into sets of ray data elements, and which sets of ray data elements are associated with which position or offset values may be predefined. FIG. 8 shows an example division of ray data elements of the store groups shown therein into sets, and a mapping between the sets and an offset value. For example, for the Call store group, the ray data elements thereof are divided into seventeen sets of ray data elements, each of which comprises a single ray data element. Specifically, the first set comprises the MISS_INDEX ray data element, the second set comprises the PAYLOAD_0 ray data element, the third set comprises the PAYLOAD_1 ray data element and so on. Each set is associated with an offset value. Specifically the first set (comprising the MISS_INDEX ray data element) is associated with offset value 0, the second set (comprising the PAYLOAD_0 ray data element) is associated with offset value 1, the third set (comprising the PAYLOAD_1 ray data element) is associated with offset value 2. In this example, to write the ORIGIN_X, ORIGIN_Y, ORIGIN_Z, DIRECTION_X, DIRECTION_Y and DIRECTION_Z ray data elements to the external unit (e.g. RAC 112) with a single RSTORE instruction, the store group identifier field 902 may be set to identify the Call store group, the offset field 906 may be set to the offset of the first set that comprises a ray data element to be written (i.e. to an offset of 4 (decimal)), and the length field may be set to 6 (decimal) to indicate that 6 ray data elements are to be written.

Similarly, it can be seen in FIG. 8 that the Trace store group is divided into sixteen sets of ray data elements. Each set comprises only a single ray data element except two sets. Specifically, one set comprises both the NCM_T and TMIN ray data elements, and another set comprises both the CM_T and CD_T ray data elements. This means that either the NCM_T or TMIN ray data element can be written to the external unit with a single RSTORE instruction that identifies the Trace store group, but not both. Similarly, either the CM_T or CD_T data element can be written to the external unit (e.g. RAC 112) with a single RSTORE instruction that identifies the Trace store group, but not both. Like the Call store group, each set of ray data elements is associated with an offset value which indicates its position or location within the store group. For example, the first set (the set comprising the ORIGIN_X ray data element) is associated with offset value 0, the second set (the set comprising the ORIGIN_Y ray data element) is associated with offset value 1, and so on. In this example, to write the PAYLOAD_0, PAYLOAD_1, and PAYLOAD_2 ray data elements to the external unit (e.g. RAC 112) with a single RSTORE instruction, the store group identifier field 902 may be set to identify the Trace store group, the offset field 906 may be set to the offset of the first set comprising a ray data element to be written (i.e. offset 13 (decimal)), and the length field 905 may be set to 3 (decimal) to indicate that 3 ray data elements are to be written.

In some cases, the RSTORE instruction 900 may also comprise a source (SRC) field 908, that comprises information identifying the location in the USC 104 storage 110 (e.g. registers) that the identified ray data elements are stored. In some cases, the ray data elements that are to be written are stored in contiguous storage locations (e.g. registers). In such cases, the SRC field 908 may identify the USC 104 storage 110 location (e.g. register) at which the first ray data element to be written to the external unit (e.g. RAC 112) is located.

As described above, the ray data elements of each store group are divided into sets, and each set is associated with offset or location information. Each set may comprise only one ray data element or more than one ray data element. Where a set of ray data elements comprises only a single ray data element, then the offset information related thereto unambiguously identifies which ray data element is to be written to the external unit. If, however, a set of ray data elements comprises multiple ray data elements (which is referred to as a multi-ray data element set), the offset information related to that set does not unambiguously identify a particular ray data element to be written to the external unit (e.g. RAC 112). Accordingly, where there is at least one store group that has a multi-ray data element set, the RSTORE instruction may comprise additional information that indicates, when that set is identified, which ray data element of that set is to be written to the external unit. For example, as shown in FIG. 9 the RSTORE instruction 900 may comprise a SPACE_CTRL field 910 which is used to indicate which ray data element of an identified multi-ray data element set is to be written.

For example, in the example store groups shown in FIG. 8, both the Trace store group and the Query store group have multi-ray data element sets. Specifically, the Trace store group comprises (i) a set of ray data elements that includes the NCM_T ray data element and the TMIN ray data element; and (ii) a set of ray data elements that includes the CM_T ray data element and the CD_T ray data element. The Query store group has seven multi-ray data element sets. In this example, the SPACE_CTRL field 910 may comprise, when any of these multi-ray data element sets is identified (by the offset and length fields), information that indicates which ray data element of each identified multi-ray data element set is to be written.

In this example, the bits of the SPACE_CTRL field 910 may be used differently depending on whether the Trace store group or the Query store group is identified (and the SPACE_CTRL field 910 may not be used if the Call store group is identified since the Call store group does not have any multi-ray data element sets (i.e. each set only comprises a single ray data element)). For example, the SPACE_CTRL field 910 may comprise four bits and Table 4 shows how the bits may be used to identify which specific ray data elements are to be written to the external unit when the group identifier field identifies the Trace store group and at least one of the multi-ray data element sets is identified by the offset and length fields 906, 904.

TABLE 4

Trace Store Group

| SPACE_CTRL Bit | Description |
| --- | --- |
| 0 | when this is set - write TMIN<br>when this is not set - do not write TMIN |
| 1 | when this is set - write NCM_T<br>when this is not set - do not write NCM_T |
| 2 | when this is set - write CD_T<br>when this is not set - do not write CD_T |
| 3 | when this is set - write CM_T<br>when this is not set - do not write CM_T |

It can be seen that for the Trace store group, the two multi-ray data element sets include four unique ray data elements (TMIN, NCM_T, CD_T and CM_T), and that each bit of the SPACE_CTRL field 910 is associated with one of those ray data elements. Specifically, bit 0 is associated with the TMIN ray data element, bit 1 is associated with the NCM_T ray data element, bit 2 is associated with the CD_T ray data element, and bit 3 is associated with the CM_T ray data element. When a bit of the SPACE_CTRL field 910 is set to one value (e.g. '1') the corresponding ray data element is to be written to the external unit and when it is set to another value (e.g. '0') the corresponding ray data element is not to be written to the external unit. Since TMIN and NCM_T are in the same set they both cannot be written to the external unit with the same RSTORE instruction (if the store group is the Trace store group), thus only one of bits 0 and 1 can be set at the same time. Similarly, since CD_T and CM_T are in the same set they both cannot be written to the external unit with the same RSTORE instruction (if the store group is the Trace store group) thus only one of bits 2 and 3 may be set at the same time.

Table 5 shows how the bits of the SPACE_CTRL field 910 may be used to identify which specific ray data elements are to be written to the external unit when the group identifier field identifies the Query store group and at least one of the multi-ray data element sets thereof is identified by the offset and length fields.

TABLE 5

Query Store Group

| SPACE_CTRL Bit | Description |
| --- | --- |
| 0 | when this is set - write NCM_INST_IN, NCM_PRIM_IN, NCM_GEOM_IN<br>when this is not set - write CM_INST_IN, CM_PRIM_IN, CM_GEOM_IN |
| 1 | NOT USED |
| 2 | when this is set - write CD_T, CD_INST_IN, CD_PRIM_IN, CD_GEOM_IN<br>when this is not set - do not write CD_T, CD_INST_IN, CD_PRIM_IN, CD_GEOM_IN |
| 3 | when this is set - write CM_T, CM_INST_IN, CM_PRIM_IN, CM_GEOM_IN<br>when this is not set - do not write CM_T, CM_INST_IN, CM_PRIM_IN, CM_GEOM_IN |

As described above, the Query store group comprises the multi-ray data element sets shown in Table 6.

TABLE 6

| Set | Data Element 0 | Data Element 1 |
| --- | --- | --- |
| 8 | CM_T | CD_T |
| 10 | CM_INST_IN | NCM_INST_IN |
| 11 | CM_PRIM_IN | NCM_PRIM_IN |
| 12 | CM_GEOM_IN | NCM_GEOM_IN |
| 13 | CM_INST_IN | CD_INST_IN |
| 14 | CM_PRIM_IN | CD_PRIM_IN |
| 15 | CM_GEOM_IN | CD_GEOM_IN |

It has been determined that the following combinations of ray data elements from these sets are likely to be written together which is reflected in Table 5.
NCM_INST_IN, NCM_PRIM_IN, NCM_GEOM_IN
CM_INST_IN, CM_PRIM_IN, CM_GEOM_IN
CD_T, CD_INST_IN, CD_PRIM_IN, CD_GEOM_IN
CM_T, CM_INST_IN, CM_PRIM_IN, CM_GEOM_IN Accordingly, as shown above, bits of the SPACE_CTRL field 910 may be used to identify individual ray data elements of a multi-ray data element set by (i) having one bit associated with a particular ray data element which is used to identify that particular ray data element; (ii) having one bit associated with a particular multi-ray data element set comprising two ray data elements, which is used to identify one of the ray data elements in the set; and (iii) having one or more bits associated with multiple multi-ray data element sets, which are used to identify one ray data element in each set (e.g. the first ray data element of each set, or the second ray data element of each set, or a specific combination of ray data elements in the sets). It will be evident to a person of skill in the art that any combination of these techniques or methods may be used to identify individual ray data elements in multi-ray data element sets. It will also be evident to a person of skill in the art that these are only examples of how the bits of the SPACE_CTRL field 910 may be used to identify individual ray data elements of multi-ray data element sets and that the bits of the SPACE_CTRL field 910 may be used in any suitable manner to identify ray data elements of multi-ray data element sets.

In the example store groups shown in FIG. 8, there are two store groups that have multi-ray data element sets. However, it will be evident to those of skill in the art that this is just an example only and that none of the store groups may have a multi-ray data element set (i.e. each set of data elements may only comprise a single ray data element) or one, two or more than two store groups may comprise a multi-ray data element set. Furthermore, in the example store groups shown in FIG. 8, one store group has two multi-ray data element sets and another store group comprises seven multi-ray data element sets. It will be evident to those of skill in the art that this is an example only and that a store group can comprise any number of multi-ray data element sets.

As described above, a USC 104 receives shader tasks from a scheduler. Each shader task specifies the data to be processed and the shader (e.g. program) to be used to process that data. In response to receiving a shader task, a USC 104 executes the identified shader against the identified data. A ray tracing shader task may be associated with a plurality of rays and the identified ray tracing shader is applied to one or more of the plurality of rays. Accordingly, an RSTORE instruction that is run as part of a shader task is said to be associated with the plurality of rays associated with the shader task, and the ray data elements identified therein are to be stored in the external unit (e.g. RAC 112) for one or more of the rays associated with the RSTORE instruction.

Not all of the rays associated with a ray tracing shader task may be 'active' for an RSTORE instruction executed as part of the shader task, and preferably only the ray data for the active rays for the RSTORE instruction is stored in the external unit (e.g. RAC 112) to avoid writing unnecessary data to the external unit. Accordingly, in the methods described below it is determined which rays of the plurality of rays associated with an RSTORE instruction are active for the RSTORE instruction and the ray data elements identified in an RSTORE instructions are stored in the external unit (e.g. RAC 112) for only the active rays. However, in other examples, instead of determining which of the rays associated with an RSTORE instruction are active it may be simpler to simply store the identified ray data elements for all of the rays associated with the RSTORE instruction.

The active rays for an RSTORE instruction may be set at the shader task level or the instruction level. Specifically, some rays may be inactive for a ray tracing shader task such that they will be inactive for any RSTORE instruction executed as part of that ray tracing shader task. However, different RSTORE instructions that are executed as part of the same ray tracing shader task may have different active rays. For example, only rays 1 and 2 associated with a ray tracing shader task may be active for a first RSTORE instruction that is executed as part of the ray tracing shader task, and only rays 3 and 4 associated with the ray tracing shader task may be active for a second, different, RSTORE instruction that is executed as part of the ray tracing shader task.

Figure 10:
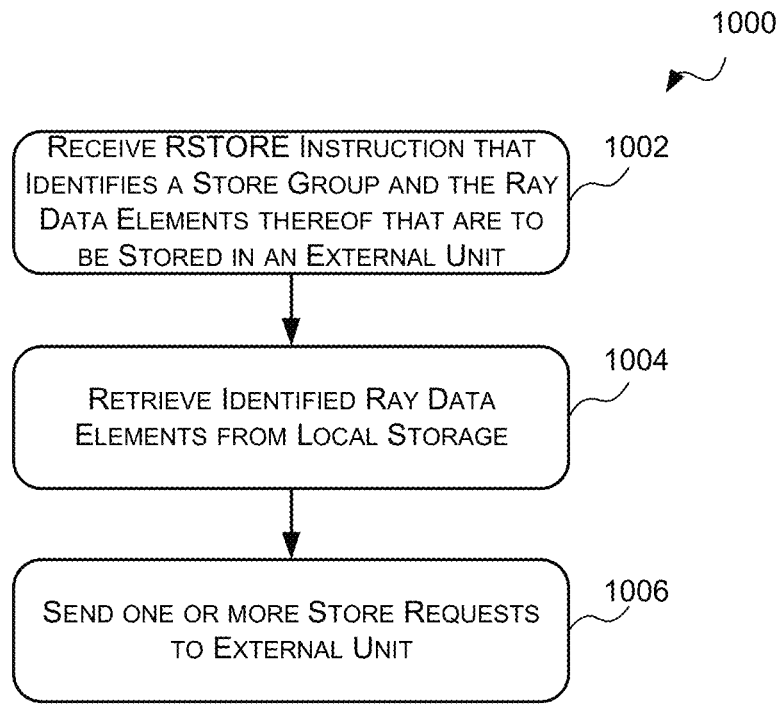
FIG. 10 is flow diagram of example method of processing a ray store instruction.

Reference is now made to FIG. 10 which illustrates an example method 1000 of executing an RSTORE instruction at a USC 104 (e.g. store logic 126). The method 1000 begins at block 1002 where the USC 104 (e.g. store logic 126) receives an RSTORE instruction, such as that described with respect to FIG. 9. As described above, an RSTORE instruction identifies a pre-defined store group of ray data elements (e.g. one of the store groups shown in FIG. 8) and the specific ray data elements of that store group that are to be written to an external unit (e.g. RAC 112). After receiving the RSTORE instruction, the method 1000 proceeds to block 1004 where the USC 104 (e.g. store logic 126) retrieves the identified ray data elements from the USC 104 local storage 110. The method 1000 then proceeds to block 1006 where the USC 104 sends one or more store requests to the external unit (e.g. RAC 112) which causes, for each of one or more rays associated with the RSTORE instruction, the identified ray data elements of the identified store group to be written to storage of the external unit (e.g. RAC 112 storage units 114, 116).

The store interface 120 between the external unit (e.g. RAC 112) and the USC 104 which is used to send data from the USC 104 to the external unit (e.g. RAC 112) may not be large enough to transmit all of the identified ray data elements to the external unit (e.g. RAC 112) in the same cycle. Accordingly, the USC 104 may transmit the identified ray data elements to the external unit (e.g. RAC 112) over a plurality cycles. The one or more ray data elements that are transmitted in a cycle may be referred to as a store transaction. In some cases, the number of ray data elements that may be transmitted in the same cycle (e.g. as part of the same store transaction) is based on the size of the store interface 120 and the size of the ray data elements. The size of the store interface 120 is defined as the amount of data that can be transferred across the store interface 120 at the same time. For example, if the store interface 120 is 128 bits wide and each ray data element is a dword (i.e. 32 bits) then four ray data elements may be transmitted in the same cycle (e.g. in the same store transaction).

In some cases, the USC 104 may be configured to implement block 1006 of the method 1000 of FIG. 10 (i.e. sending one or more store requests to the external unit to cause the identified ray data elements to be stored in the external unit) by converting the RSTORE instruction into a plurality of store transactions and sending a separate store transaction request to the external unit (e.g. RAC 112) for each store transaction. In other words, the USC 104 may be configured to expand a received RSTORE instruction into a plurality of store transactions. This may also be described as serializing the RSTORE instruction. For example, if four store transactions are to be used to transmit the ray data elements identified in an RSTORE instruction from the USC 104 to the external unit (e.g. RAC 112), then the USC 104 (e.g. store logic 126) may generate and transmit four store transaction requests to the external unit (e.g. RAC 112). In response to receiving a store transaction request, the external unit (e.g. RAC 112) stores the received ray data elements in the correct location in its storage units 114, 116 according to the type of ray data elements.

In some cases, there may be one or more types of store groups, and the technique used to convert an RSTORE instruction into a plurality of transactions may be based on the type of store group identified in the RSTORE instruction. For example, the one or more types of store groups may include one or more of per ray (or per instance) store groups and per ray block store groups. Transactions for a per ray store group may comprise only ray data elements associated with the same ray (e.g. different ray data elements associated with the same ray). An example method of converting an RSTORE instruction that relates to a per ray store group into a plurality of store transactions is described with respect to FIG. 11. Transactions for a per ray block store group may comprise only the same ray data element for multiple rays. RSTORE instructions that relate to a per ray block store group may be converted into a plurality of store transactions in a similar manner to how an RLOAD instruction that relates to a per ray block load group is converted into a plurality of load transactions. It will be evident to a person of skill in the art that these are only example types of store groups, and there may be other types of store groups that may be converted into a plurality of store transactions in a different manner.

As described above, each store transaction for a per ray store group may only comprise ray data elements that relate to the same ray. For example, a store transaction for a per ray store group may comprise the ORIGIN_X, ORIGIN_Y and ORIGIN_Z ray data elements for the same ray. In contrast, a store transaction for a per ray store group may not comprise a CM_T ray data element for a first ray and a CM_T ray data element for a second, different, ray. In some cases, the ray data elements of a per ray store group are divided into one or more blocks and a store transaction for a per ray store group can comprise only ray data elements in the same block. In these cases, when the USC 104 (e.g. store logic 126) receives an RSTORE instruction in which a per ray store group is identified, the USC 104 (e.g. store logic 126) may be configured to convert the received RSTORE instruction into a plurality of store transactions by: determining which blocks of the identified store group comprise at least one identified ray data element, and for each block that comprises at least one identified ray data element, issuing, for each of one or more rays associated with the RSTORE instruction, a store transaction request with the identified ray data elements in that block. Accordingly, in this RSTORE conversion technique, store transaction requests are not issued for empty blocks of the identified store group—i.e. a store transaction is not generated for blocks of the identified store group that do not comprise at least one identified ray data element.

For example, let each of the example store groups shown in FIG. 8 be a per ray store group. It can be seen in FIG. 8 that the ray data elements of each of these store groups have been divided into blocks wherein the ray data elements in a block may form part of the same store transaction. For example, the ray data elements of the Trace store group have been divided into four blocks (blocks 0, 1, 2 and 3), the ray data elements of the Query store group have been divided into four blocks (blocks 0, 1, 2 and 3), the ray data elements of the Call store group have been divided into five blocks (blocks 0, 1, 2, 3 and 4).

Since there is a maximum number, N, of ray data elements that can be transmitted as part of a single store transaction, only N ray data elements in a block can be transmitted as part of a single store transaction. Therefore, each block may comprise a maximum of N sets of one or more ray data elements, where, as described above, each set of ray data elements comprises a single ray data element or a multiple mutually exclusive ray data elements. This means that a store transaction can comprise a ray data element from each set associated with a block. In the examples described herein, N is four (i.e. four ray data elements can be transmitted as part of a single store transaction) so each of the blocks shown in FIG. 8 comprise a maximum of four sets of ray data elements.

As described above, each set of ray data elements in a store group may be associated with an offset (or other similar information) that indicates the position of the set of ray data elements in the store group. In some cases, as shown in FIG. 8, the ray data elements in a block are the ray data elements associated with a contiguous set of offsets (e.g. N offsets). For example, as shown in FIG. 8, the first block of each store group may comprise the sets of ray data elements associated with the first four offsets (e.g. offsets 0 to 3), the second block of each store group may comprise the sets of ray data elements associated with the next four offsets (e.g. offsets 4 to 7) and so on.

Figure 11:
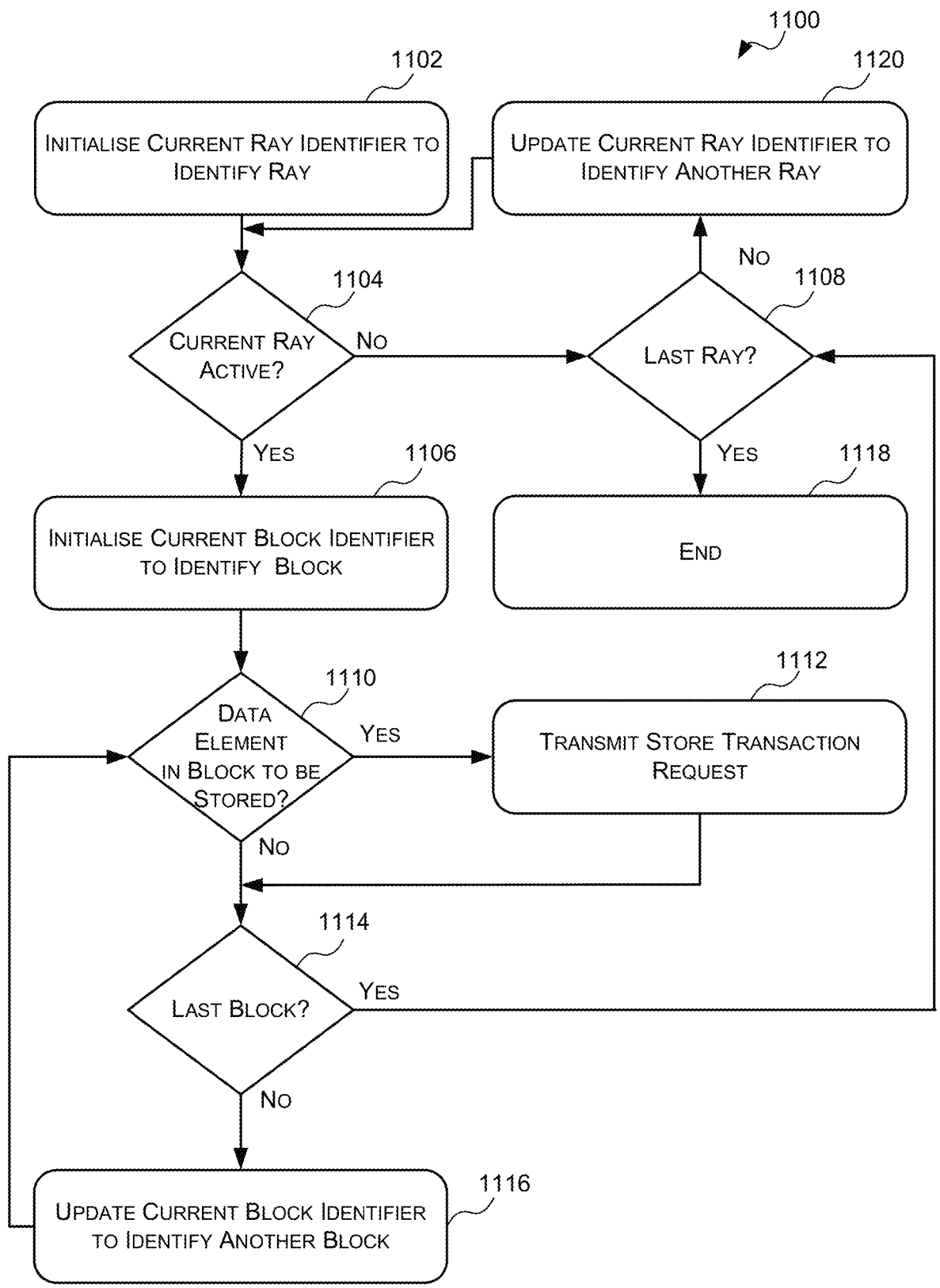
FIG. 11 is a flow diagram of an example method of converting a ray store instruction into a plurality of store transaction requests.

Reference is now made to FIG. 11 which illustrates an example method 1100, which may be implemented by a USC 104 (e.g. store logic 126), to convert an RSTORE instruction (that identifies a per ray store group) into a plurality of store transactions. The method 1100 begins at block 1102 where the USC 104 (e.g. store logic 126) initialises a current ray identifier (which may also be referred to as the instance identifier). The current ray identifier identifies one ray of the plurality of rays associated with the RSTORE instruction. The ray identified by the current ray identifier may be referred to as the current ray. The current ray identifier may be initialised to identify the first ray associated with the RSTORE instruction. In some cases, each of the plurality of rays associated with the RSTORE instruction may be identified by a unique value. In some cases, the current ray identifier may be a counter that is initialised to a predetermined value (e.g. 0). Once the current ray identifier has been initialised, the method 1100 proceeds to block 1104.

At block 1104, the USC 104 (e.g. store logic 126) determines whether the current ray is active. The USC 104 may be configured to receive, along with an RSTORE instruction, information indicating which of the plurality of rays associated with the RSTORE instruction are active. If it is determined that the current ray is active, then the method 1100 proceeds to block 1106. If, however, it is determined that the current ray is not active then the method 1100 proceeds directly to block 1108.

At block 1106, the USC 104 (e.g. store logic 126) initialises a current block identifier to identify a block of the identified store group. The block identified by the current block identifier may be referred to as the current block. In some cases, the current block identifier may be initialised to identify the first block of the identified store group. In some cases, the current block identifier may take the form of a counter and the counter may be initialised to a predetermined value (e.g. 0). Once the current block identifier has been initialised, the method 1100 proceeds to block 1110.

At block 1110, the USC 104 (e.g. store logic 126) analyses the RSTORE instruction to determine whether at least one ray data element in the current block is to be written to the external unit (e.g. RAC 112). Where an RSTORE instruction comprises an offset (OFFSET) field and a length (LENGTH) field as described above, the range of blocks which comprise at least one ray data element may be determined to be [OFFSET/(RT_USC_DATA_WIDTH/RAY_DATA_ELEMENT_WIDTH)] to [(OFFSET+LENGTH−1)/(RT_USC_ DATA_WIDTH/RAY_DATA_ELEMENT_WIDTH)]. In such cases, the USC 104 (e.g. store logic 126) may be configured to determine that at least one ray data element in the current block is to be written to the external unit (e.g. RAC 112) if the value of the current block identifier falls within this range. If it is determined that at least one ray data element in the current block is to be written to the external unit (e.g. RAC 112), the method 1100 proceeds to block 1112. If, however, it is determined that none of the ray data elements in the current block are to be stored in the external unit (e.g. RAC 112) then the method 1100 proceeds to block 1114.

At block 1112, the USC 104 (e.g. store logic 126) generates and sends a store transaction request to the external unit (e.g. RAC 112) to store the identified ray data elements in the current block, for the current ray. In some cases, the store transaction request comprises (i) information identifying the current ray; (ii) information identifying the store group; (iii) information identifying the current block; (iv) information identifying the relevant ray data elements of the current block; and (v) the identified ray data elements (i.e. the data to be stored).

Reference is now made to FIG. 12 which shows an example format for a store transaction request 1200. The example store transaction request 1200 comprises: a ray identifier field 1202, a block identifier field 1204, a ray data element set identifier field 1206, a store group identifier field 1208, and a plurality of data fields 1210, 1212, 1214, 1216. The ray identifier field 1202 (which may also be referred to as the INSTANCE field) identifies the ray that the request relates to, and may be set to the value of the current ray identifier. The block identifier field 1204 (which also may be referred to as the ADDR field) identifies the block (of the identified store group) that the request relates to, and may be set to the value of the current block identifier.

The ray data element set identifier field 1206 (which, when implemented as a mask, may be referred to as the MASK field) identifies the ray data element sets in the identified block from which a ray data element is to be stored in the external unit. The ray data element set identifier field 1206 may be generated from the length and offset information in the RSTORE instruction. For example, if the RSTORE instruction identifies the Trace store group of FIG. 8, and the offset field is set to 2, the length field is 6 and the current block is block 0, then it is known that a ray data element in each of sets 2 to 7 are to be stored. Therefore, for block 0, the MASK field may be set to '0011' (binary) to indicate that ray data elements from the last two sets in the block are to be stored.

The store group identifier field 1208 (which may be referred to as the SPACE field) identifies the relevant store group, and may include the store group identifier information that is in the RSTORE instruction. Where the RSTORE instruction comprises a SPACE_CTRL field, the store transaction request 1200 may also comprise a SPACE_CTRL field 1218 which includes the SPACE_CTRL information from the RSTORE instruction. It will be evident to a person of skill in the art that this is an example only and that in other examples a store transaction request may take a different form and/or have different fields and/or additional fields.

The data fields 1210, 1212, 1214, 1216 comprise the ray data elements that are to be stored in the storage of the external unit (e.g. RAC 112 storage units 114, 116). The number of data fields is equal to the number of ray data elements that can be sent as part of a single store transaction request. In this example, four ray data elements can be sent as part of a single store transaction request, so there are four data fields. An identified ray data element is placed in the data field corresponding to its position in the block. For example, if the RSTORE instruction identifies the Trace store group of FIG. 8, and the offset field is set to 2, the length field is 6 and the current block is block 0, then it is known that a ray data element in each of sets 2 to 7 are to be stored. So, for the store transaction request for block 0, the ORIGIN_Z ray data element is placed in the third data field 1214, the DIRECTION_X ray data element is placed in the fourth data field 1216, and the first and second data fields 1210, 1212 can be left empty (or can contain any data since they will be ignored by the external unit).

Upon receiving a store transaction request, the external unit (e.g. RAC 112) determines, from the store group, block, and ray data element set identifier information which ray data elements are being received and where they are to be stored in the external unit storage (e.g. RAC 112 storage units 114, 116). Specifically, the external unit (e.g. RAC 112) may have, for each store group, a mapping between each ray data element in that group and the location of that ray data element in the storage units 114, 116.

Returning to FIG. 11, once the USC 104 has sent a store transaction request to the external unit (e.g. RAC 112), the method 1100 proceeds to block 1114.

At block 1114, the USC 104 (e.g. store logic 126) determines whether the current block is the last block (e.g. whether all possible blocks of the store group have been assessed). Where the current block identifier is implemented as a counter that is initialised to 0, the USC 104 may determine whether the current block is the last block by comparing the block counter to (the maximum number of blocks per store group−1). If it is determined that the current block is the last block, then the method 1100 proceeds to block 1108. If, however, it is determined that the current block is not the last block then the method 1100 proceeds to block 1116.

At block 1116, the USC 104 (e.g. store logic 126) updates the current block identifier (e.g. the current block counter is incremented) to identify another block (e.g. the next block). Once the current block identifier has been updated, the method 1100 proceeds back to block 1110 where the USC 104 (e.g. store logic 126) determines whether any of the ray data elements associated with the new current block are to be stored.

At block 1108, the USC 104 (e.g. store logic 126) determines whether the current ray is the last ray associated with the RSTORE instruction (i.e. whether all of the rays associated with the RSTORE instruction have been analysed). Where the current ray identifier is implemented as a counter that is initialised to 0, the USC 104 (e.g. store logic 126) may determine whether the current ray is the last ray by comparing the current ray counter to (the maximum number of rays associated with an RSTORE instruction−1). In some cases, the maximum number of rays associated with an RSTORE instruction may be 128. However, it will be evident that this is an example only and that in other examples there may be a different number of rays that may be associated with an RSTORE instruction. If it is determined that the current ray is the last ray associated with the RSTORE instruction, then the method 1100 ends 1118. If, however, it is determined that the current ray is not the last ray associated with the RSTORE instruction, then the method 1100 proceeds to block 1120.

At block 1120, the current ray identifier is updated (e.g. the current ray counter is incremented) to identify another ray (e.g. the next ray). Once the current ray identifier has been updated, the method 1100 proceeds back to block 1104.

Example Uses of RLOAD and RSTORE Instructions

Example uses of the RLOAD and RSTORE instructions described herein when a USC 104 is used to implement ray tracing with the load and store groups described with respect to FIGS. 2 and 8 will now be described. In some cases, ray tracing may begin with a ray generation shader. The ray generation shader may require the x and y launch IDs and the x and y launch sizes for the rays to generate the x, y, z origins thereof. To load the required data into the USC 104 the ray generation shader may include an RLOAD instruction which requests the LAUNCH_ID_X and LAUNCH_ID_Y ray data elements from the Primary load group (e.g. the load group identifier field may be set to "001" (binary) as per Table 2, and the mask field may be set to "00000000000000110000" (binary, lowest bit index in the rightmost position)); and an RLOAD instruction which requests the LAUNCH_SZ_X and LAUNCH_SZ_Y ray data elements from the Launch Size load group (e.g. the load group identifier field may be set to "010" (binary) as per Table 2, and the mask field may be set to "00000000000000000111" (binary, lowest bit index in the rightmost position)). The ray generation shader may then define all the ray setup and then store this data in the external unit (e.g. RAC 112). To store this data in the external unit (e.g. RAC 112) the ray generation shader may comprise an RSTORE instruction to store all of the ray data elements in the Trace store group except the third payload ray data element (e.g. the store group identifier may be set to "00" (binary) as per Table 3, the offset may be set to "0" (binary) and the length may be set to 15 (decimal), and the SPACE_CTRL field may be set to "1001" (binary, lowest bit index in the rightmost position) to indicate the TMIN and CM_T ray data elements are to be stored, as per Table 4). After executing the RSTORE instruction a hierarchy search, the process of finding intersections, which may also be referred to as a ray traversal, is started and the ray generation shader is suspended.

After the hierarchy search, a miss shader may be run for the rays that have been deemed a "miss". The miss shader may require the x, y launch ray data elements and all three payload ray data elements which point to a memory hierarchy (MH) address for each ray. To obtain this data the miss shader may comprise an RLOAD instruction that requests the PAYLOAD_0, PAYLOAD_1, PAYLOAD_2, LAUNCH_ID_X and LAUNCH_ID_Y ray data elements in the Primary load group (e.g. the load group identifier field may be set to "001" (binary) and the mask field may be set to "00000000000000110111" (binary, lowest bit index in the rightmost position)). The miss shader may determine the pixel result from the launch IDs and then store, via a different instruction, the pixel result for each ray at the associated MH address.

In addition to running a miss shader, a hit shader may be run for the rays that have been deemed a "hit". The hit shader may require the data in the first two payload ray data elements which point to a MH address, the flags ray data element and the u and v ray data elements. To obtain this data the hit shader may comprise an RLOAD instruction that requests the FLAGS, U, V, PAYLOAD_0, and PAYLOAD_1 ray data elements from the Trace load group (e.g. the load group identifier field may be set to "010" (binary), and the mask field may be set to "00110000011100000000" (binary, bit index in the rightmost position)). The U and V ray data elements may then be used to derive a pixel result which may be stored, via a different instruction, to the associated MH address.

The ray generation shader may then resume where it reads the per ray result (e.g. pixel result) from the MH addresses to manipulate the output texture.

In the examples described above, individual ray data elements in a load group can be identified in an RLOAD instruction via, for example, a mask (and optionally a SPACE_CTRL field), and a contiguous block of ray data elements in a store group can be identified in an RSTORE instruction through a combination of offset and length information (and optionally a SPACE_CTRL field). This difference between RSTORE and RLOAD instructions has been made because the inventors have found that ray tracing shaders that generate ray data elements, and thus write ray data elements to the external unit (e.g. RAC 112), tend to write blocks of information in a store group whereas ray tracing shaders that process ray data elements tend to read a non-contiguous subset of a load group. Therefore an RSTORE instruction can be simplified by using an offset and length as opposed to a mask. This also allows the store logic 126 to be simplified. However, it will be evident to a person of skill in the art that the RLOAD method of identifying ray data elements (e.g. a mask field) may be used to identify ray data elements in an RSTORE instruction, and the RSTORE method of identifying ray data elements (e.g. offset and length information) may be used to identify ray data elements in a RLOAD instruction.

Figure 13:
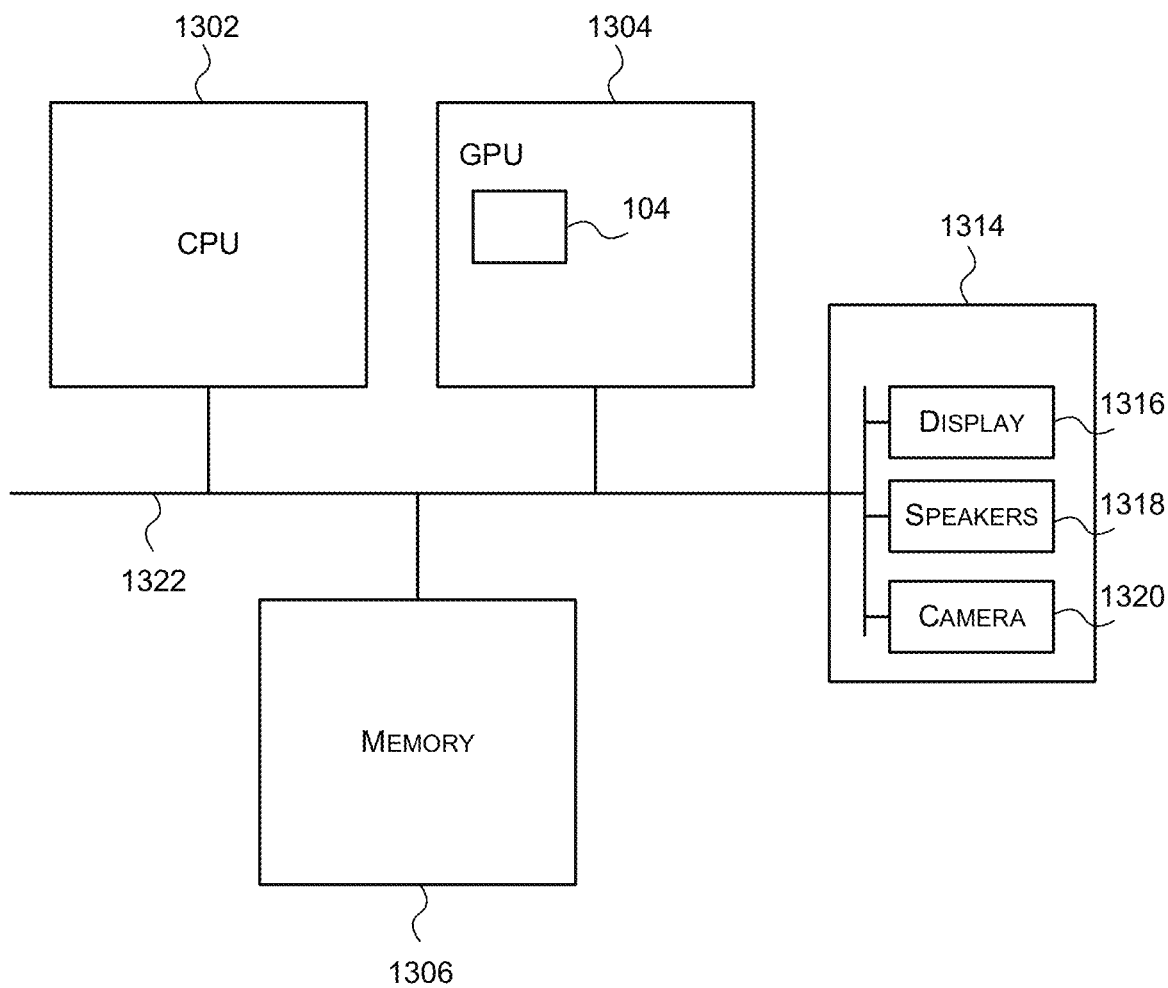
FIG. 13 is a block diagram of an example computer system in which the shader processing units, load units, store units and/or graphics processing units described herein may be implemented.

FIG. 13 shows a computer system in which the shader processing units, load logic, store logic and graphics processing units described herein may be implemented. The computer system comprises a CPU 1302, a GPU 1304 (which may be implemented as the GPU 100 described herein), a memory 1306 and other devices 1314, such as a display 1316, speakers 1318 and a camera 1320. The shader processing unit 104 described herein may be implemented on the GPU 1304. The components of the computer system can communicate with each other via a communications bus 1322.

While FIG. 13 illustrates one implementation of a graphics processing system, it will be understood that a similar block diagram could be drawn for an artificial intelligence accelerator system—for example, by replacing either the CPU 1302 or the GPU 1304 with a Neural Network Accelerator (NNA), or by adding the NNA as a separate unit. In such cases, again, the shader processing unit 104 can be implemented in the NNA.

The graphics processing unit, the shader processing unit, the load logic and store logic of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a unit or particular logic need not be physically generated by the unit or the logic at any point and may merely represent logical values which conveniently describe the processing performed by the logic or unit between its input and output.

The graphics processing units, shader processing units, load logic and store logic described herein may be embodied in hardware on an integrated circuit. The graphics processing units, shader processing units, load logic and store logic described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing unit, a shader processing unit, load logic and/or store logic configured to perform any of the methods described herein, or to manufacture a graphics processing unit, shader processing unit, load logic and/or store logic described herein. An integrated circuit definition dataset may be, for example, an integrated circuit description.

Therefore, there may be provided a method of manufacturing, at an integrated circuit manufacturing system, a graphics processing unit, shader processing unit, load logic and/or store logic as described herein. Furthermore, there may be provided an integrated circuit definition dataset that, when processed in an integrated circuit manufacturing system, causes the method of manufacturing a graphics processing unit, shader processing unit, load logic and/or store logic to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a shader processing unit or a graphics processing unit will now be described with respect to FIG. 14.

Figure 14:
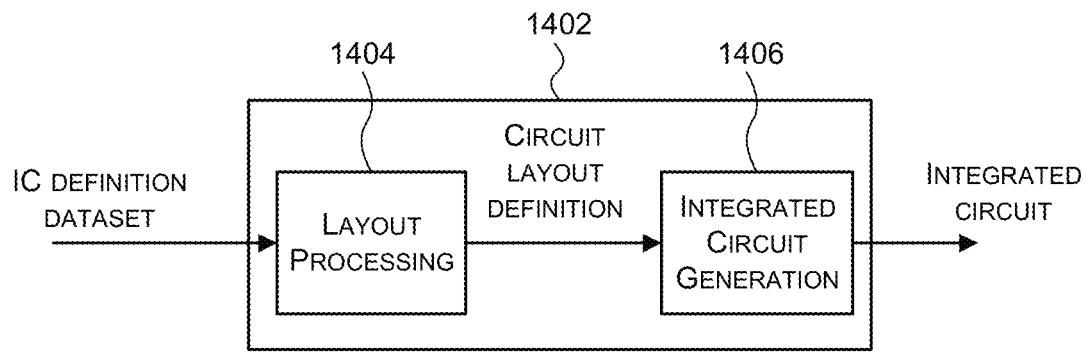
FIG. 14 is a block diagram of an example integrated circuit manufacturing system for generating an integrated circuit embodying a shader processing unit, a load unit, a store unit and/or a graphics processing unit described herein.

FIG. 14 shows an example of an integrated circuit (IC) manufacturing system 1402 which is configured to manufacture a graphics processing unit, shader processing unit, load logic and/or store logic as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining a graphics processing unit, shader processing unit, load logic and/or store logic as described in any of the examples herein), process the IC definition dataset, and generate an IC according to the IC definition dataset (e.g. which embodies a graphics processing unit, shader processing unit, load logic and/or store logic as described in any of the examples herein). The processing of the IC definition dataset configures the IC manufacturing system 1402 to manufacture an integrated circuit embodying a graphics processing unit, shader processing unit, load logic and/or store logic as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit, shader processing unit, load logic and/or store logic without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A shader processing unit for a graphics processing unit, the shader processing unit configured to execute one or more shaders, the one or more shaders comprising one or more ray tracing shaders that generate ray data associated with one or more rays, the ray data for a ray comprising a plurality of ray data elements, the shader processing unit comprising:
storage; and
store logic configured to:
receive a ray store instruction that comprises: (i) information identifying a store group of a plurality of store groups, each store group of the plurality of store groups comprising one or more ray data elements of the plurality of ray data elements, and (ii) information identifying one or more ray data elements of the identified store group to be stored in an external unit;
in response to receiving the ray store instruction, retrieve the identified ray data elements for one or more rays from the storage; and
send one or more store requests to the external unit which cause the external unit to store the identified ray data elements for the one or more rays.

2. The shader processing unit of claim 1, wherein the information identifying one or more ray data elements of the identified store group identifies a block of ray data elements of the identified store group.

3. The shader processing unit of claim 1, wherein the one or more ray data elements of each store group are divided into one or more sets of ray data elements, and the information identifying one or more ray data elements of the identified store group comprises information identifying one or more of the one or more sets of ray data elements of the identified store group.

4. The shader processing unit of claim 3, wherein each set of ray data elements of a store group is associated with an offset indicating an ordering of that set of ray data elements with respect to the other sets of ray data elements in the store group, and the information identifying one or more sets of ray data elements identifies sets of ray data elements associated with a contiguous block of offsets.

5. The shader processing unit of claim 4, wherein the information identifying one or more ray data elements of the identified store group comprises information identifying a starting offset for the contiguous block of offsets and information identifying a number of offsets in the contiguous block of offsets.

6. The shader processing unit of claim 3, wherein when at least one of the identified sets of ray data elements comprises two or more ray data elements, the information identifying one or more ray data elements of the identified store group comprises information identifying a ray data element of each of the at least one of the identified sets of ray data elements that comprise two or more ray data elements.

7. The shader processing unit of claim 1, wherein:
the identified ray data elements for the one or more rays are sent to the external unit in a plurality of store transactions, each store transaction comprising up to a predetermined maximum number of ray data elements;
the store logic is configured to divide the identified ray data elements for the one or more rays into the plurality of store transactions; and
the one or more store requests sent from the store logic to the external unit comprises a store transaction request for each of the plurality of store transactions.

8. The shader processing unit of claim 7, wherein each store transaction comprises ray data elements associated with a same ray of the one or more rays.

9. The shader processing unit of claim 7, wherein the ray data elements of each store group are divided into one or more blocks of ray data elements, and each store transaction comprises ray data elements in a same block of ray data elements.

10. The shader processing unit of claim 9, wherein:
the one or more ray data elements of each store group are divided into one or more sets of ray data elements, and the information identifying one or more ray data elements of the identified store group comprises information identifying one or more of the one or more sets of ray data elements of the identified store group; and
each block of ray data elements for a store group comprises one or more of the one or more sets of ray data elements of that store group.

11. The shader processing unit of claim 10, wherein:
each set of ray data elements of a store group is associated with an offset indicating an ordering of that set of ray data elements with respect to the other sets of ray data elements in the store group, and the information identifying one or more sets of ray data elements identifies sets of ray data elements associated with a contiguous block of offsets; and
each block of ray data elements for a store group comprises sets of ray data elements of that store group associated with a contiguous block of offsets.

12. The shader processing unit of claim 10, wherein each store transaction request comprises information identifying the store group identified in the ray store instruction, information identifying a block of ray data elements of the store group, information identifying the ray data elements of the block that are identified in the ray store instruction, information identifying a ray of the one or more rays, and the identified ray data elements.

13. The shader processing unit of claim 7, wherein the store logic is configured to divide the identified ray data elements for the one or more rays into the plurality of store transactions by, for each of the one or more rays, determining which blocks of ray data elements of the identified store group comprises an identified ray data element, and for each block of ray data elements that comprises an identified ray data element, generating a store transaction request to store the identified ray data elements in that block for that ray.

14. The shader processing unit of claim 1, wherein the ray store instruction is associated with a plurality of rays and the one or more rays for which the identified ray data elements are stored are active rays of the plurality of rays.

15. The shader processing unit of claim 1, wherein the ray store instruction further comprises information identifying a location in the storage where the identified ray data elements are stored, and the store logic is configured to retrieve the identified ray data elements from the identified location.

16. The shader processing unit of claim 1, wherein each store group of the plurality of store groups is associated with a unique identifier and the information identifying a store group comprises the unique identifier associated with the store group.

17. A method of processing a ray tracing shader at a shader processing unit of a graphics processing unit, the shader processing unit configured to execute one or more shaders, the one or more shaders comprising one or more ray tracing shaders that generate ray data associated with one or more rays, the ray data for a ray comprising a plurality of ray data elements, the method comprising:
receiving, at the shader processing unit, a ray store instruction that comprises: (i) information identifying a store group of a plurality of store groups, each store group of the plurality of store groups comprising one or more ray data elements of the plurality of ray data elements, and (ii) information identifying one or more ray data elements of the identified store group to be stored in an external unit;
in response to receiving the ray store instruction, retrieving the identified ray data elements for one or more rays from storage of the shader processing unit; and
sending one or more store requests from the shader processing unit to an external unit which causes the external unit to store the identified ray data elements for the one or more rays.

18. A shader processing unit configured to perform the method as set forth in claim 17.

19. A graphics processing unit comprising the shader processing unit as set forth in claim 1.

20. A non-transitory computer readable storage medium having stored thereon an integrated circuit definition dataset that, when processed in an integrated circuit manufacturing system, configures the integrated circuit manufacturing system to manufacture the shader processing unit as set forth in claim 1.

* * * * *